Jan. 14, 1936.   W. E. WHIPP ET AL   2,027,568
LATHE
Filed Oct. 11, 1928   34 Sheets-Sheet 10
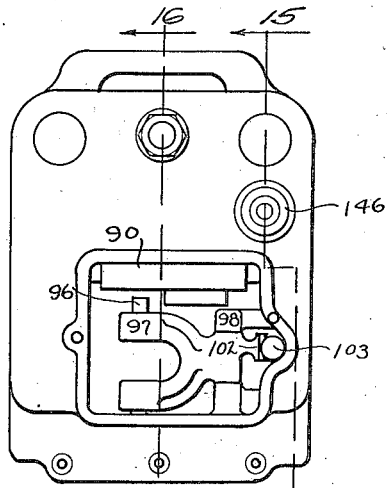
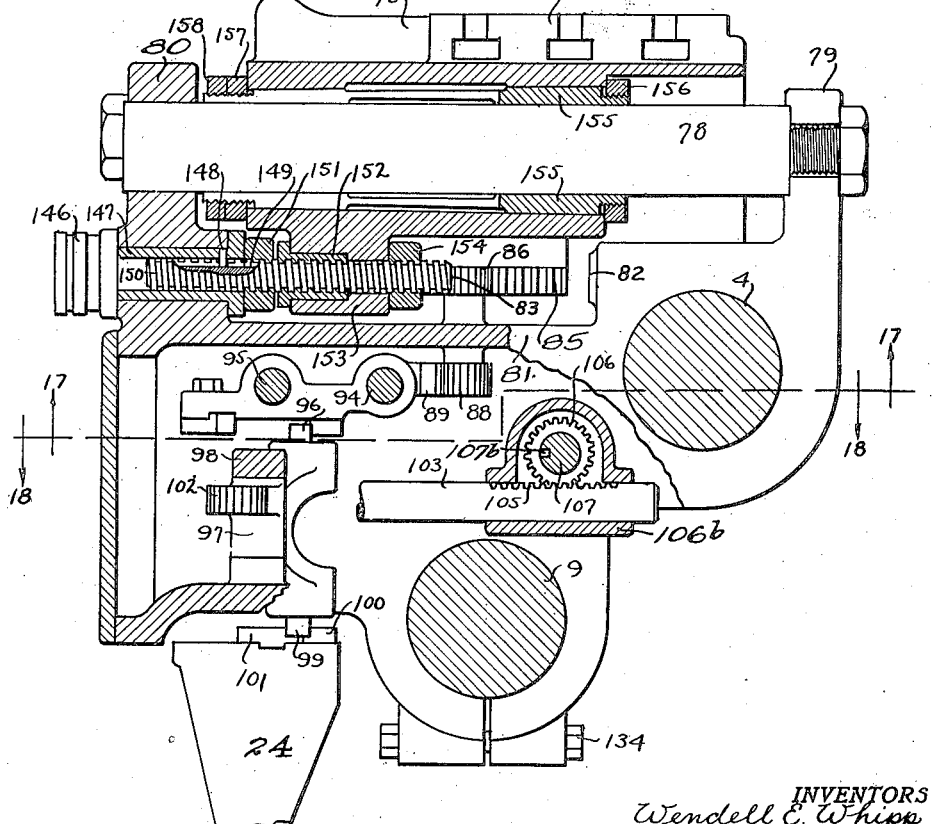
INVENTORS
Wendell E. Whipp
BY Clifford A. Bickel
Toulmin & Toulmin
ATTORNEY Jan. 14, 1936.  W. E. WHIPP ET AL  2,027,568

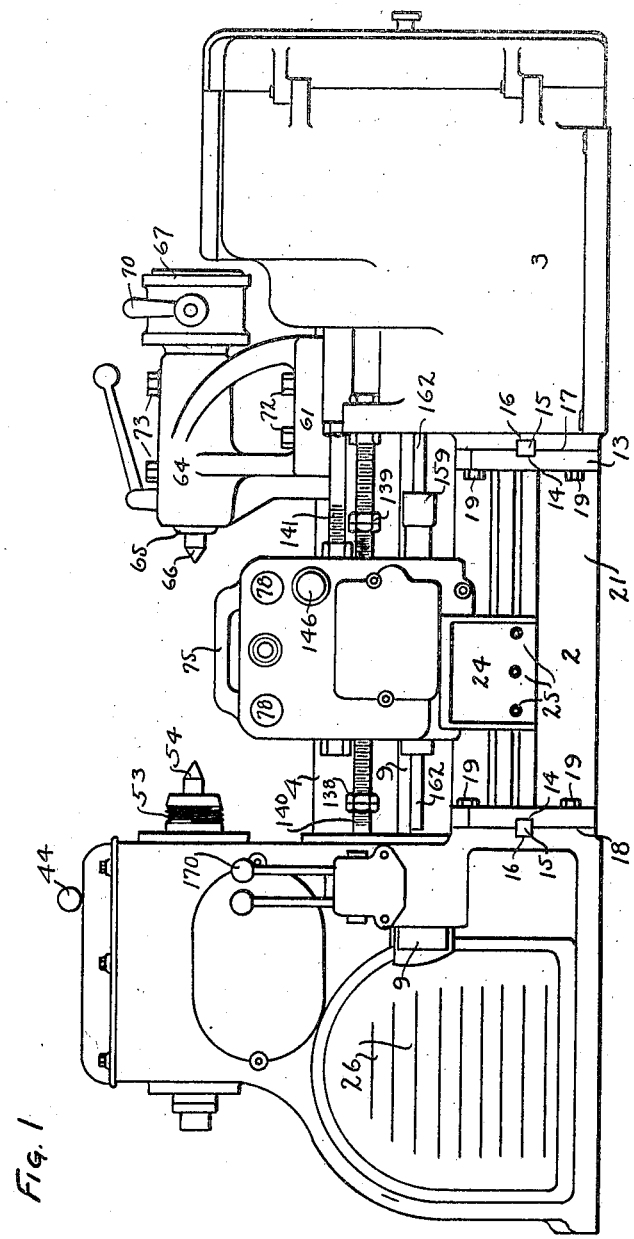

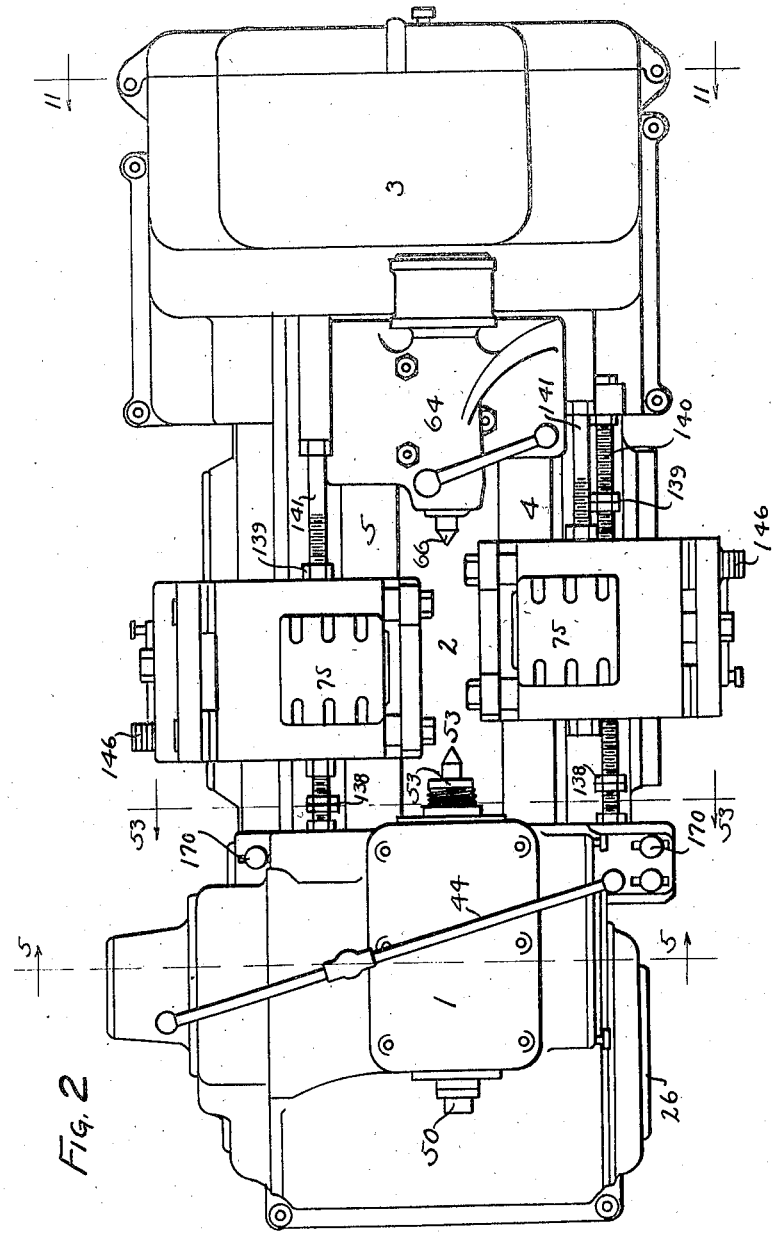

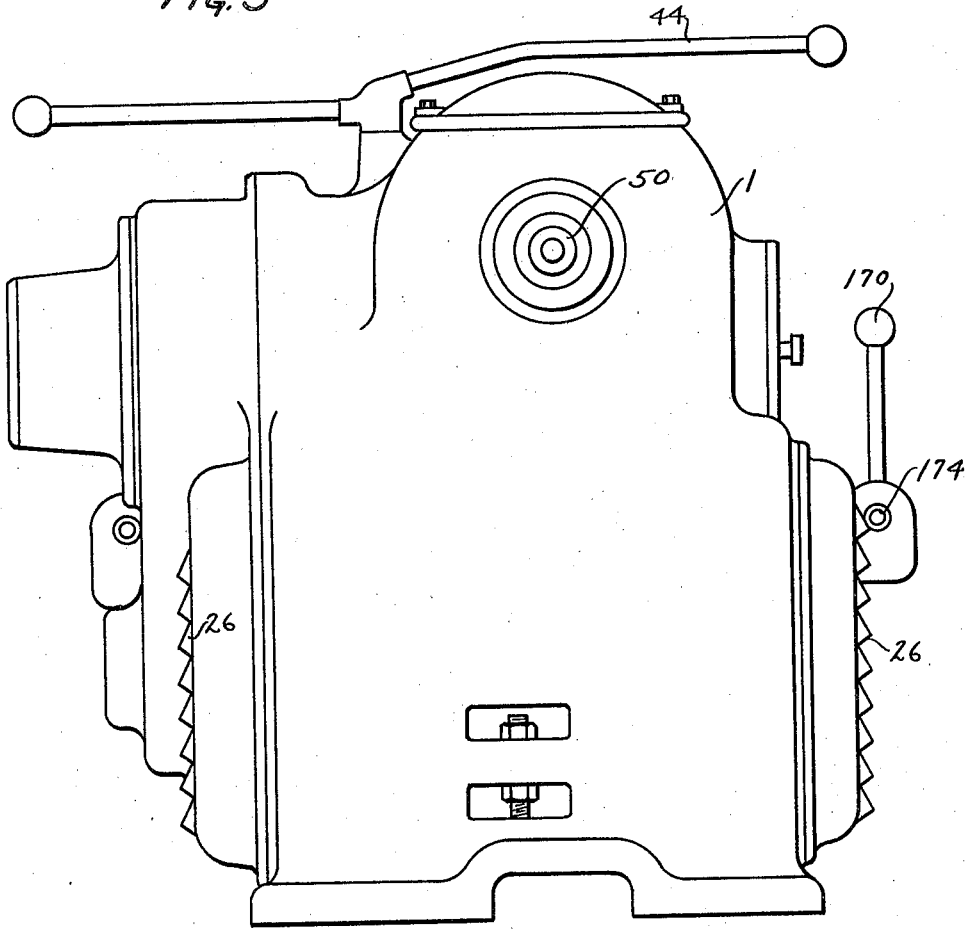

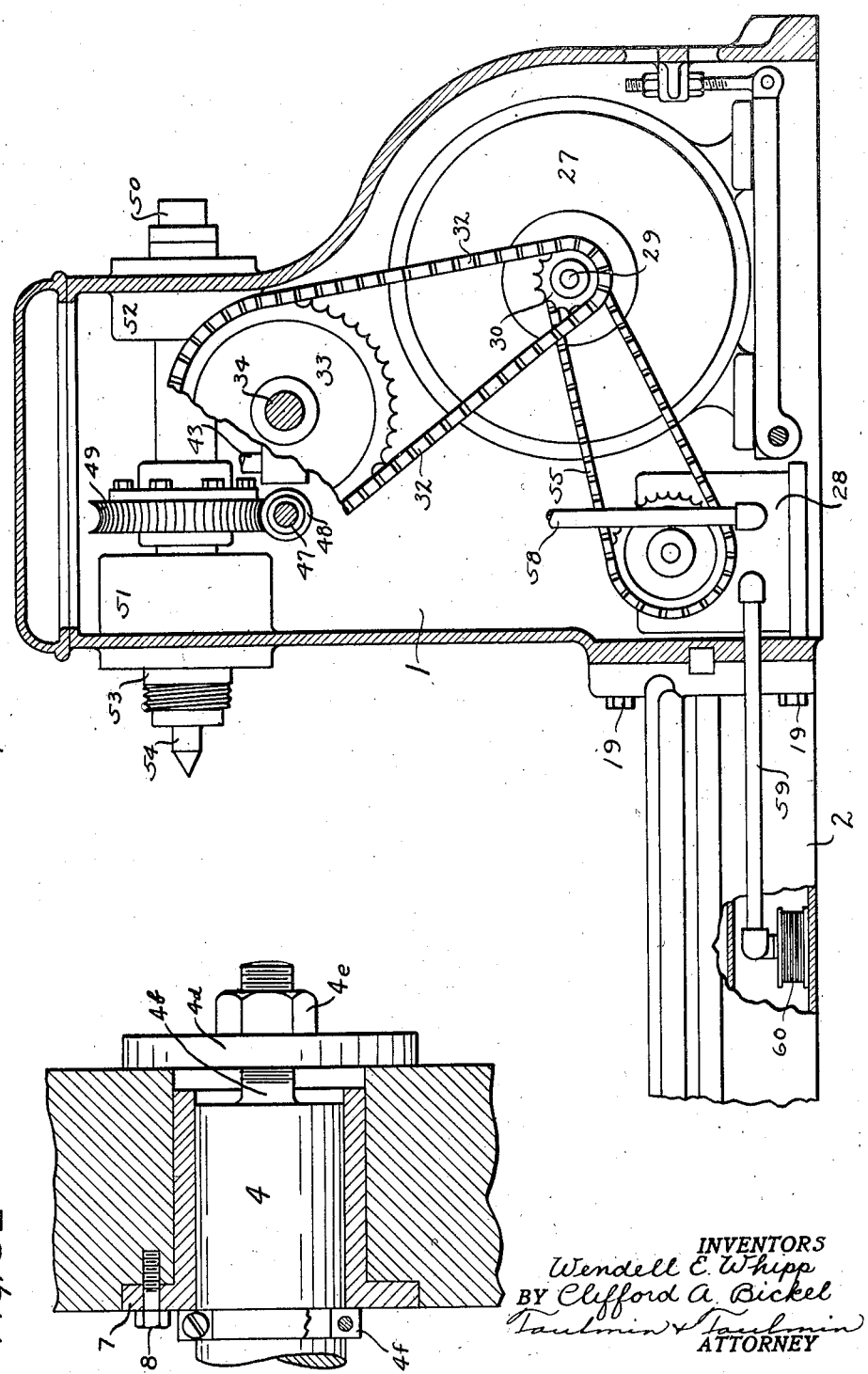

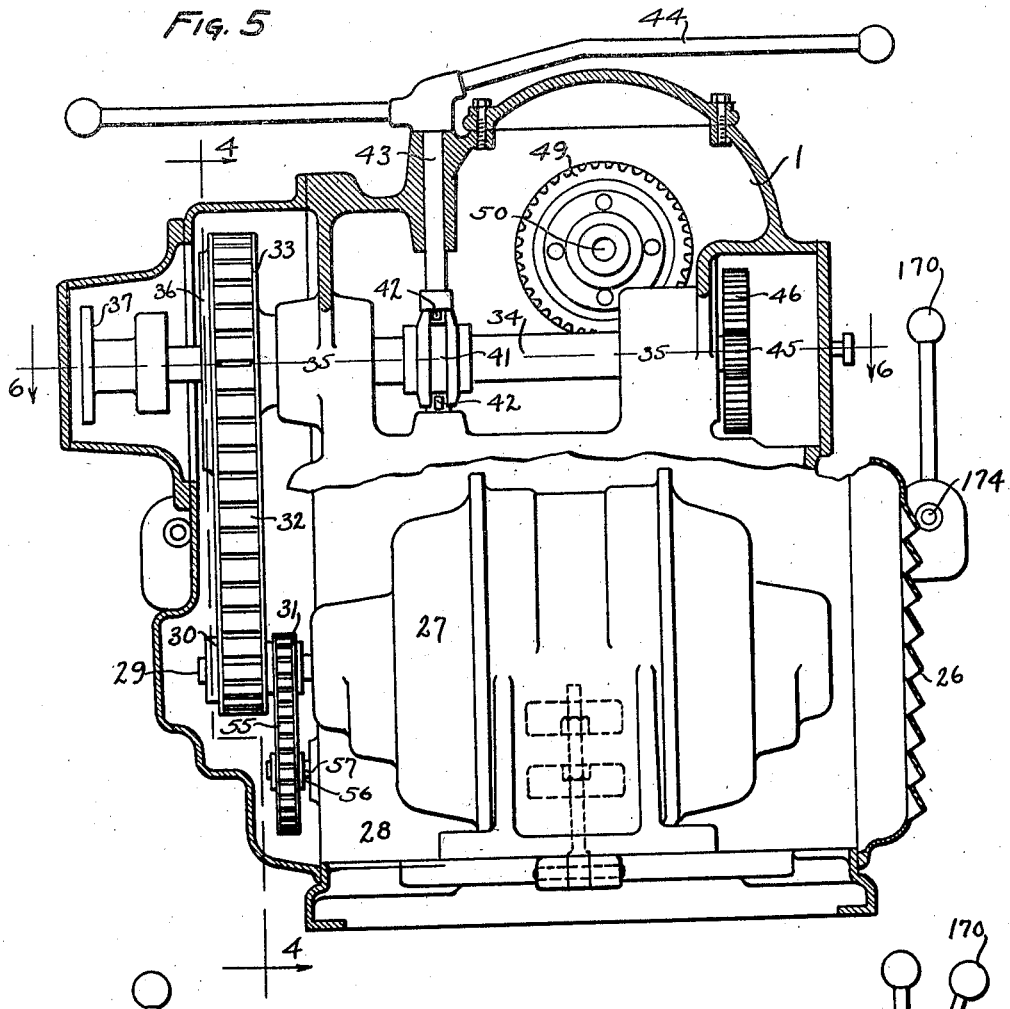
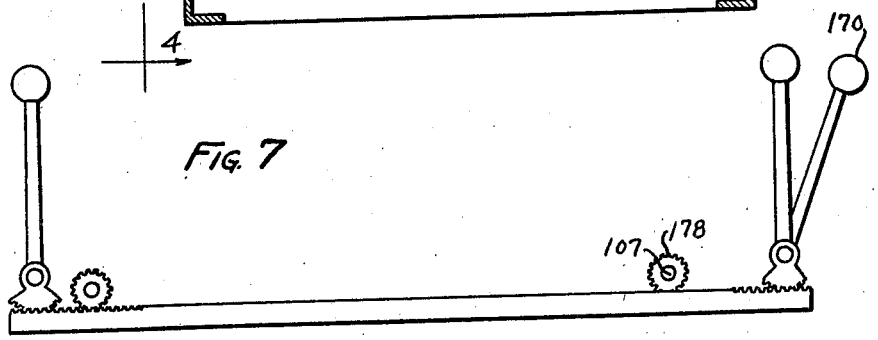

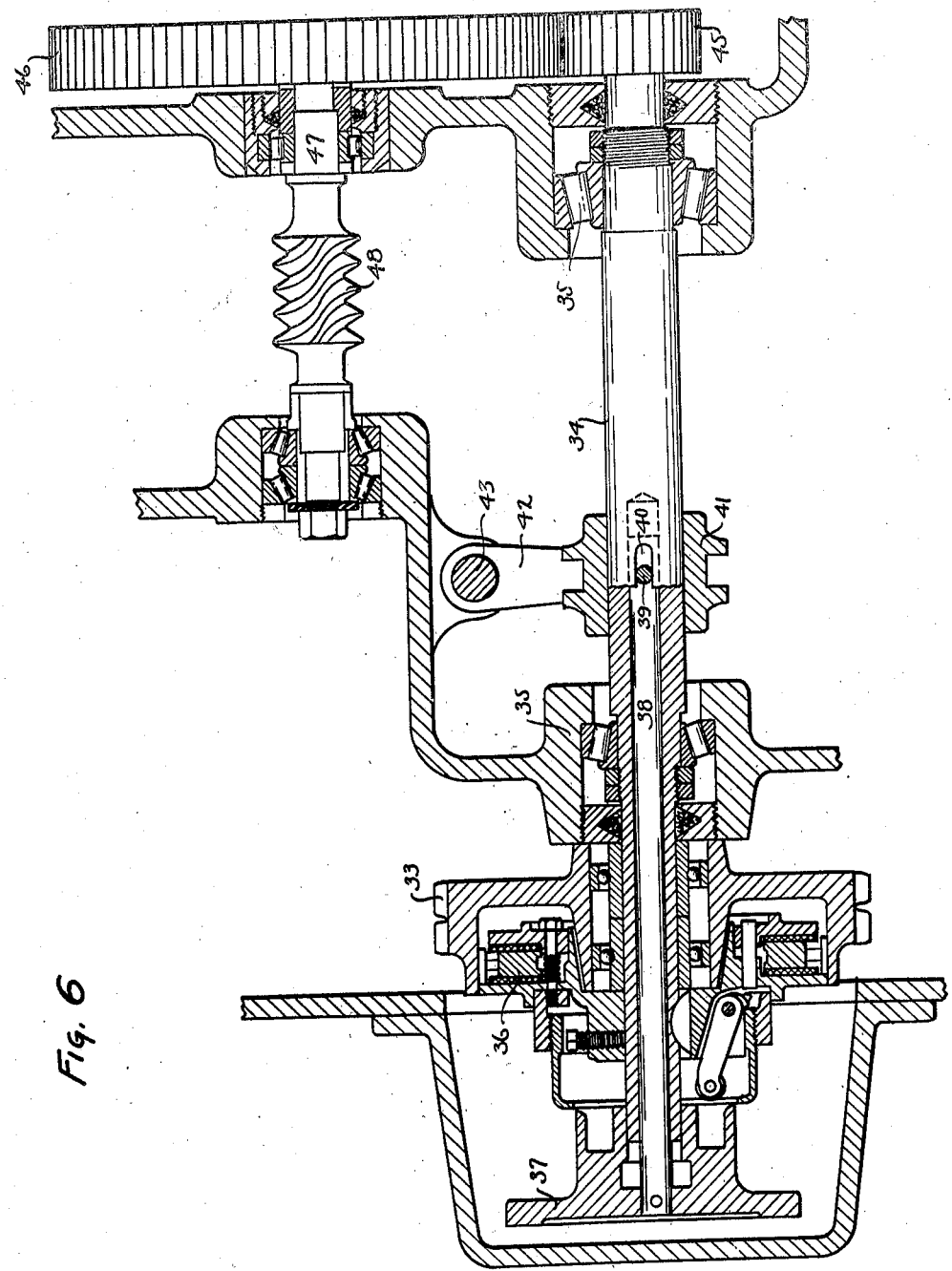

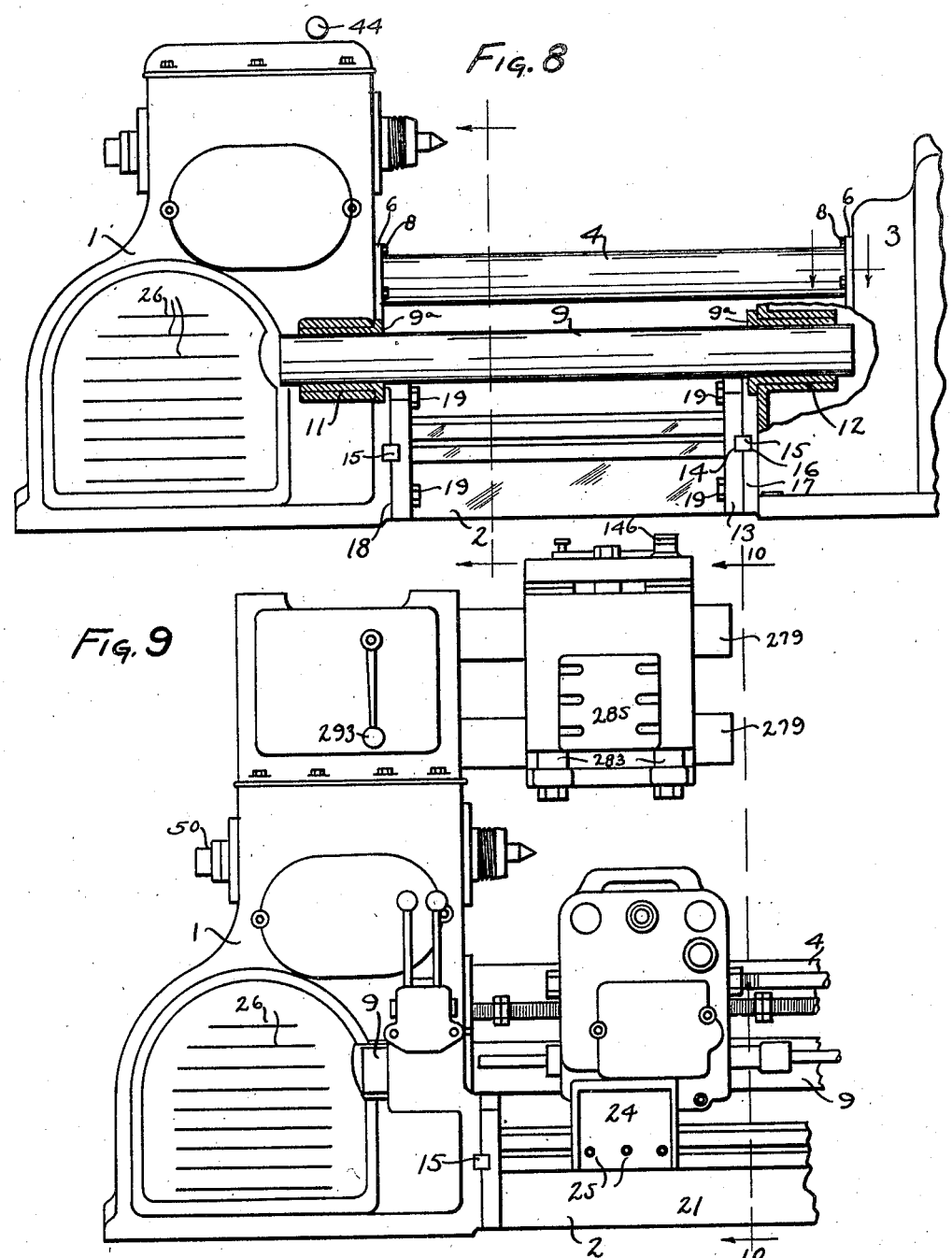

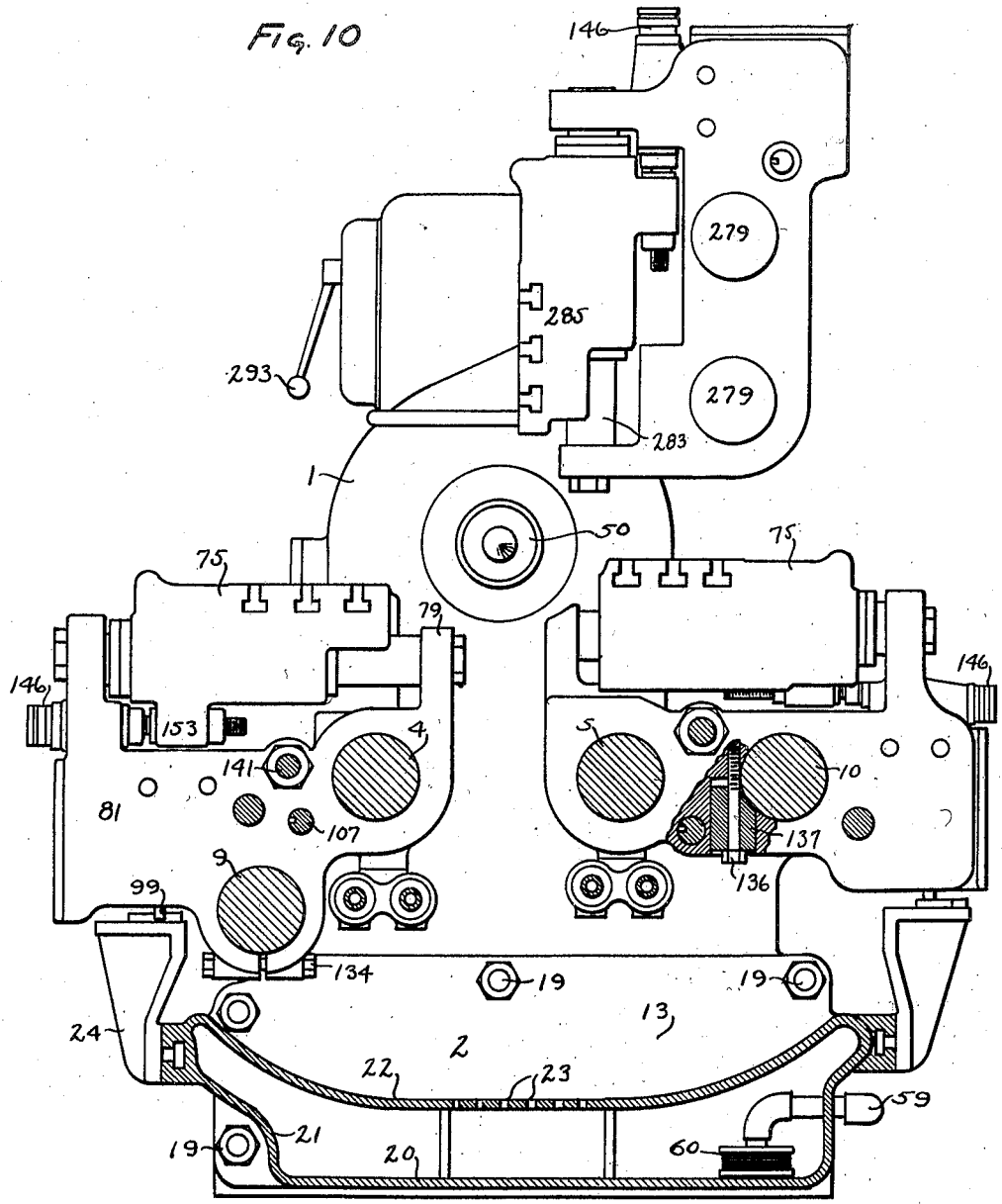

LATHE

Filed Oct. 11, 1928  34 Sheets-Sheet 11

INVENTORS
Wendell E. Whipp
BY Clifford A. Bickel
Toulmin & Toulmin
ATTORNEY

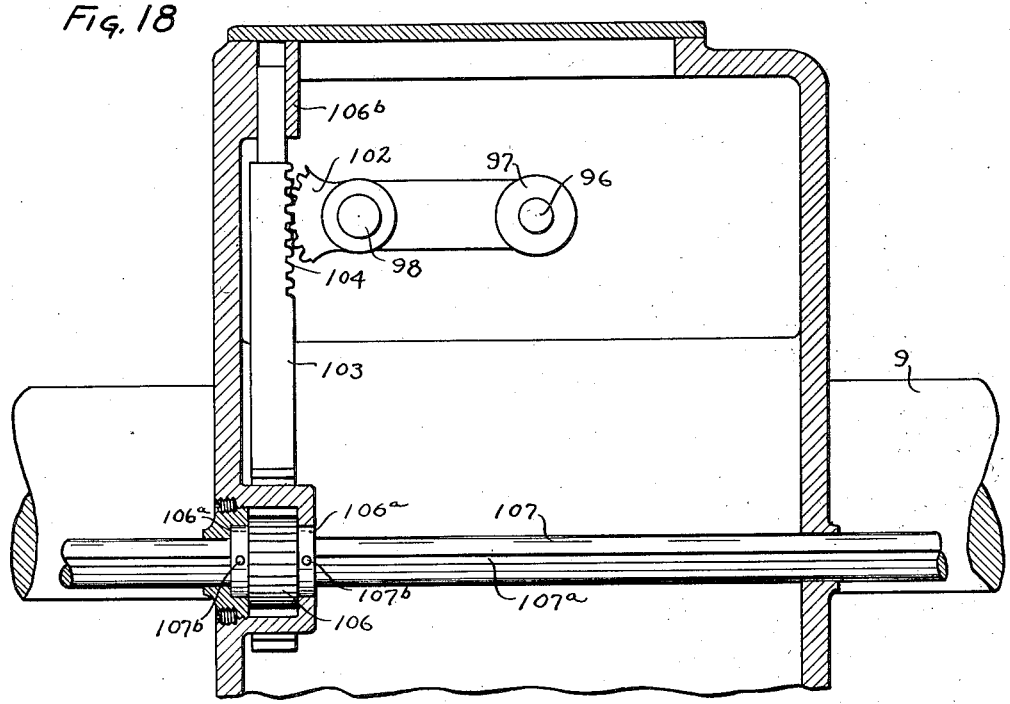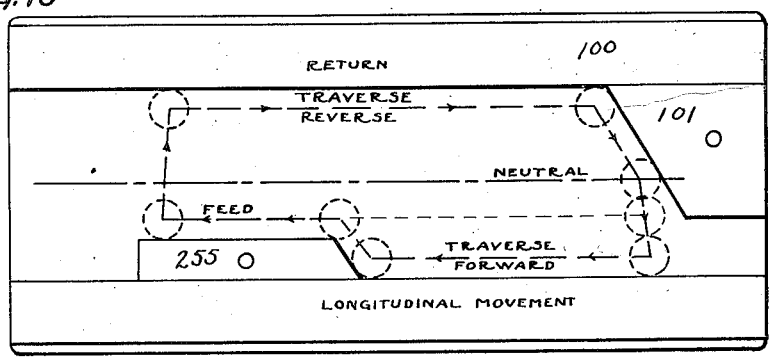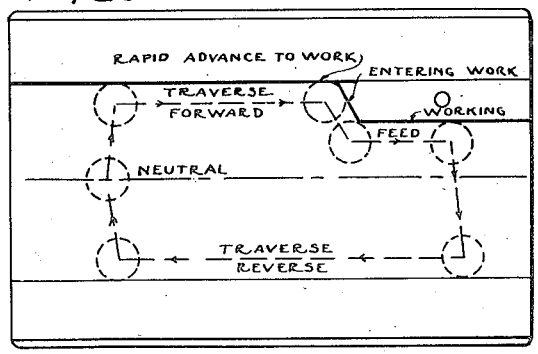

Jan. 14, 1936.  W. E. WHIPP ET AL  2,027,568
LATHE
Filed Oct. 11, 1928   34 Sheets-Sheet 13
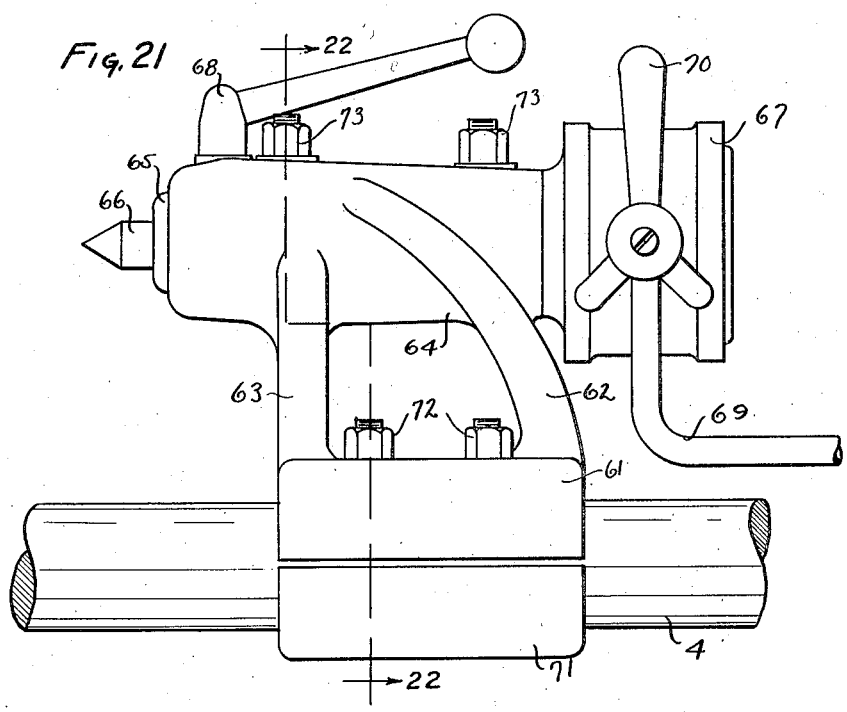
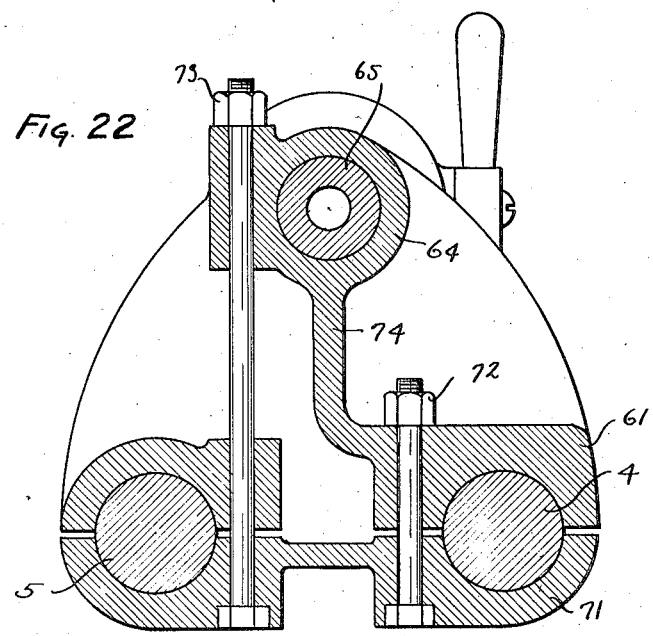
INVENTORS
Wendell E. Whipp
BY Clifford A. Bickel
Toulmin + Toulmin
ATTORNEY

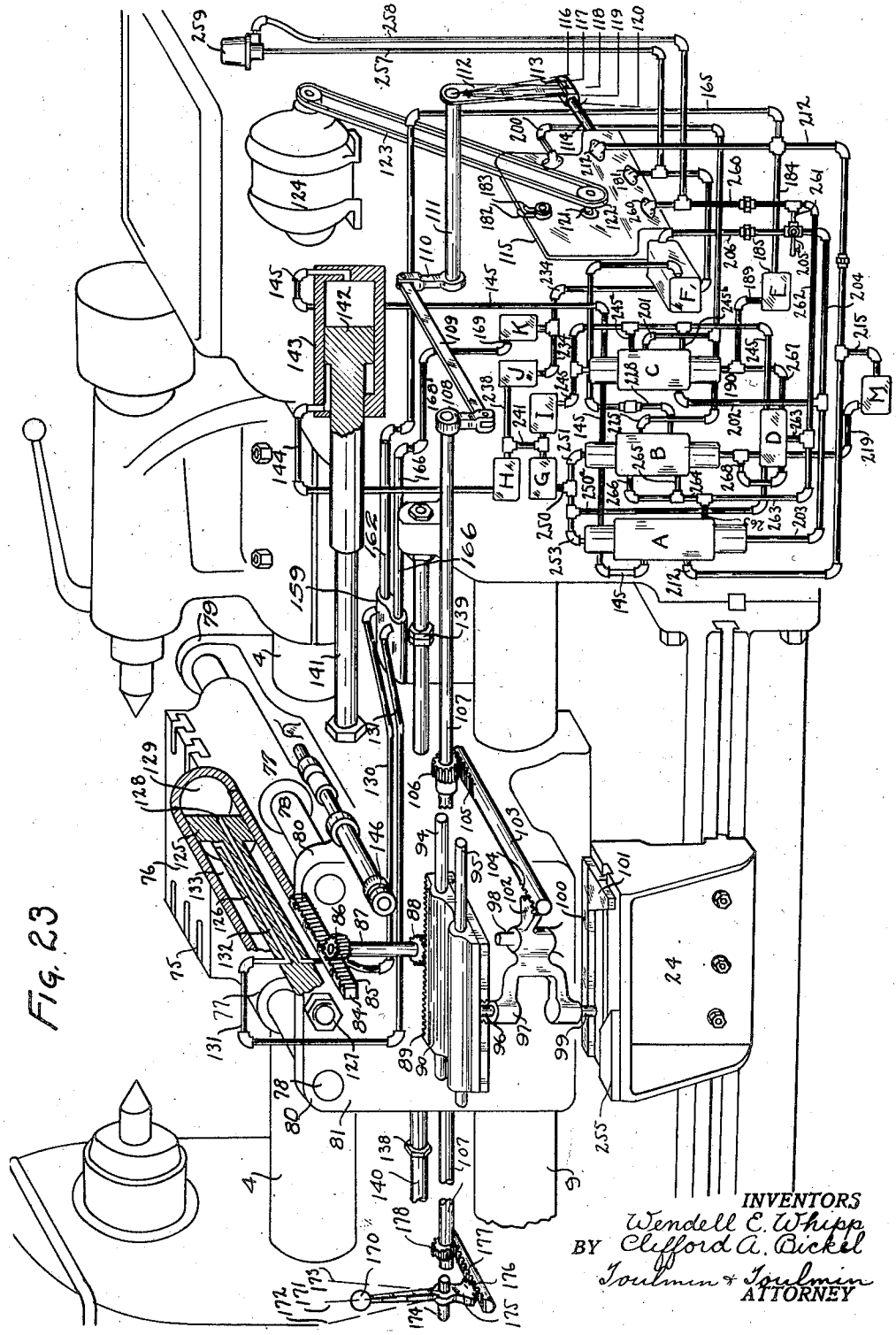

Jan. 14, 1936.  W. E. WHIPP ET AL  2,027,568
LATHE
Filed Oct. 11, 1928  34 Sheets-Sheet 15

INVENTORS
Wendell E. Whipp
Clifford A. Bickel
BY
Toulmin & Toulmin
ATTORNEY

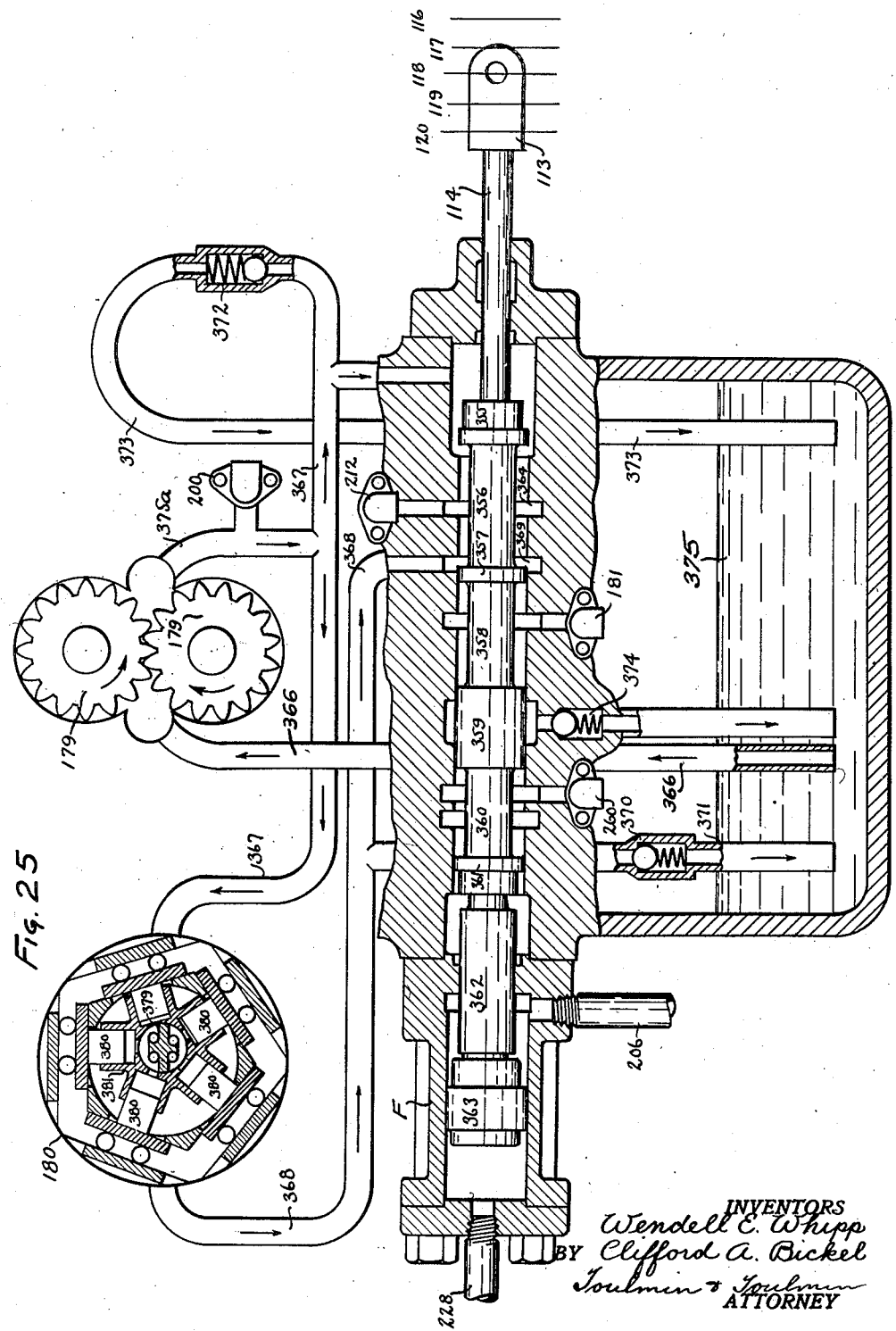

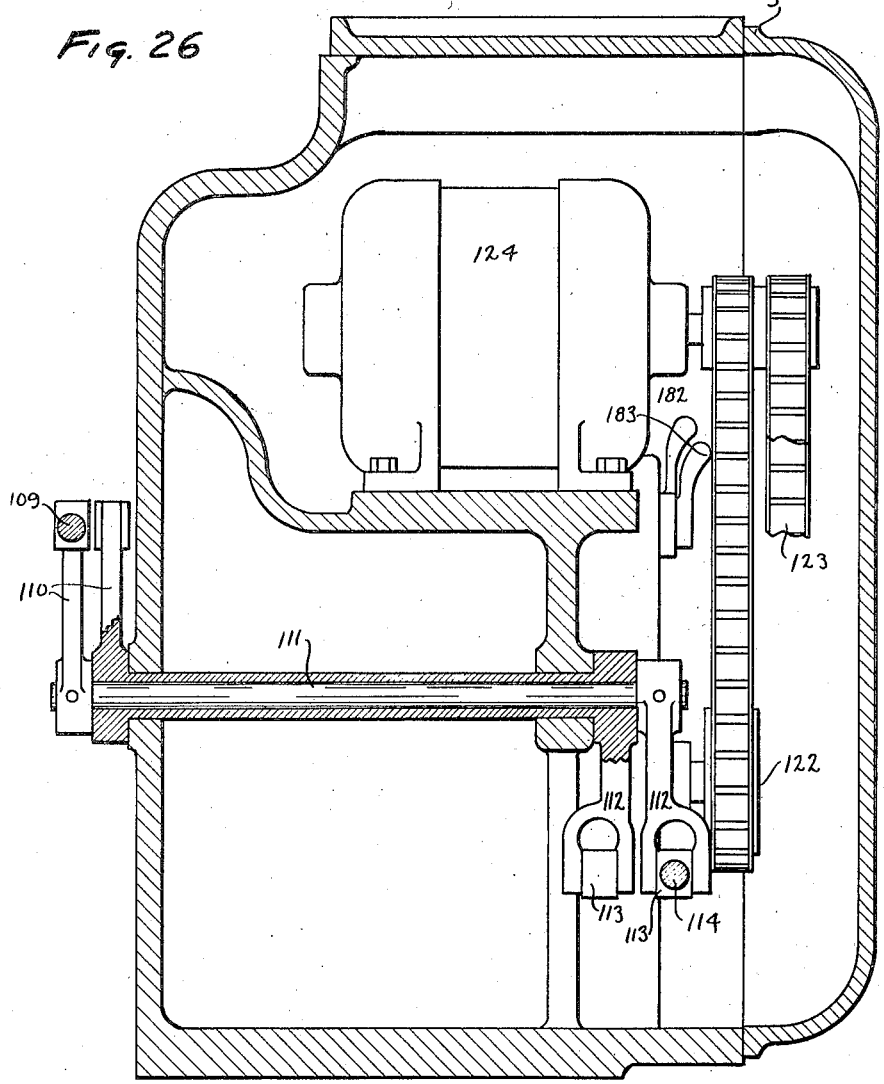

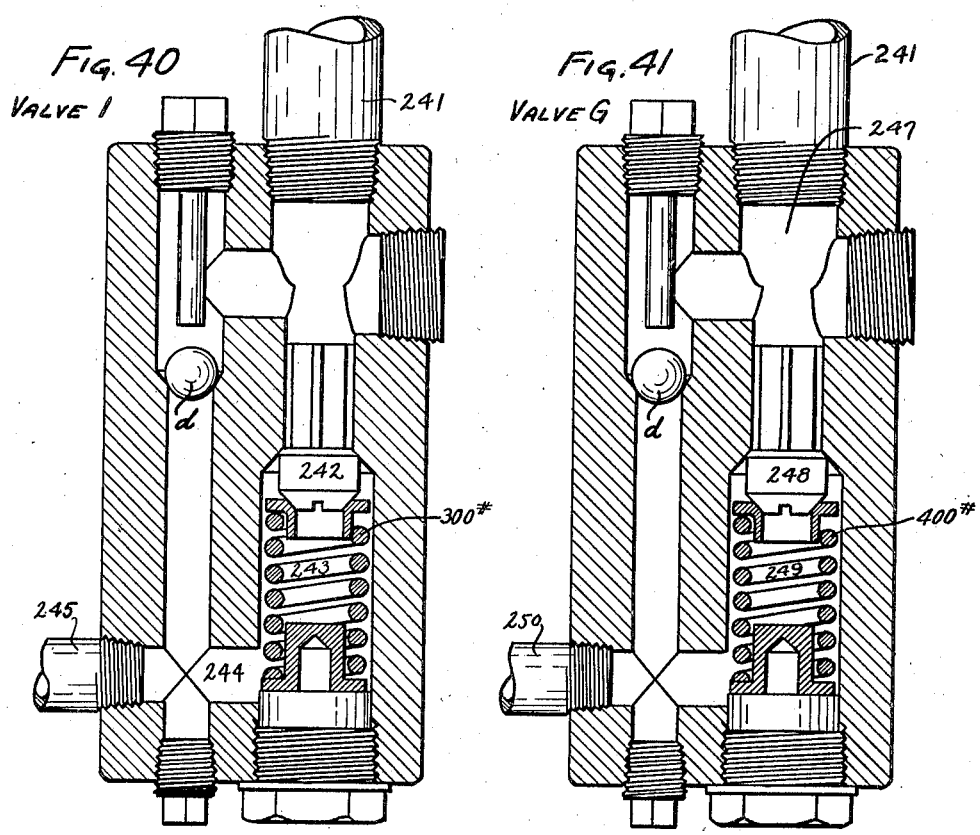
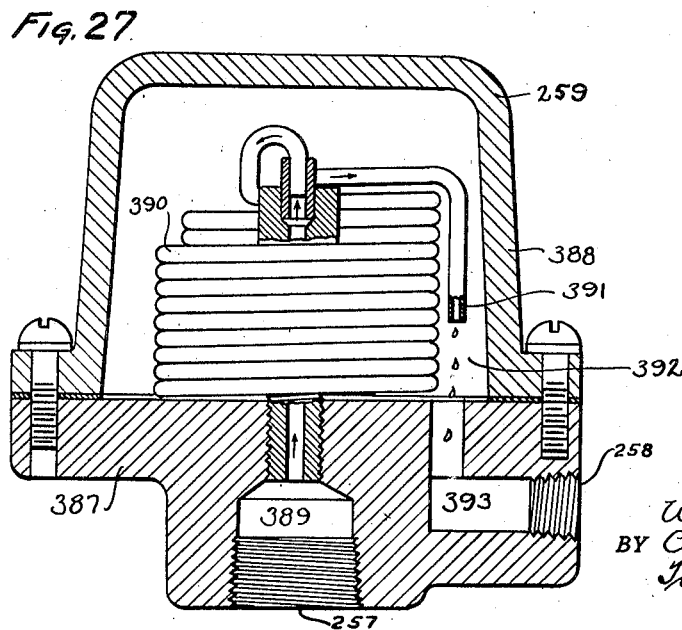

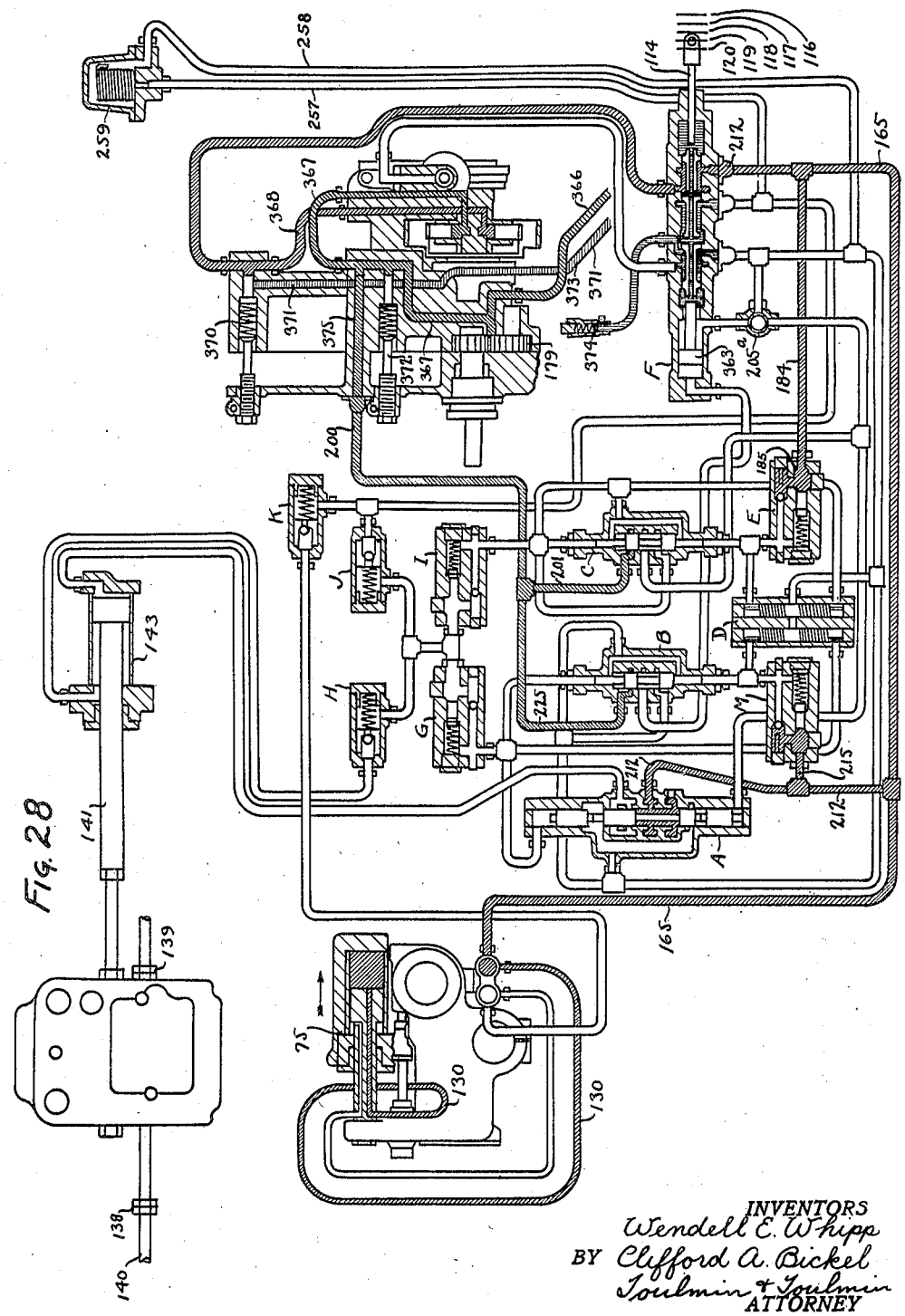

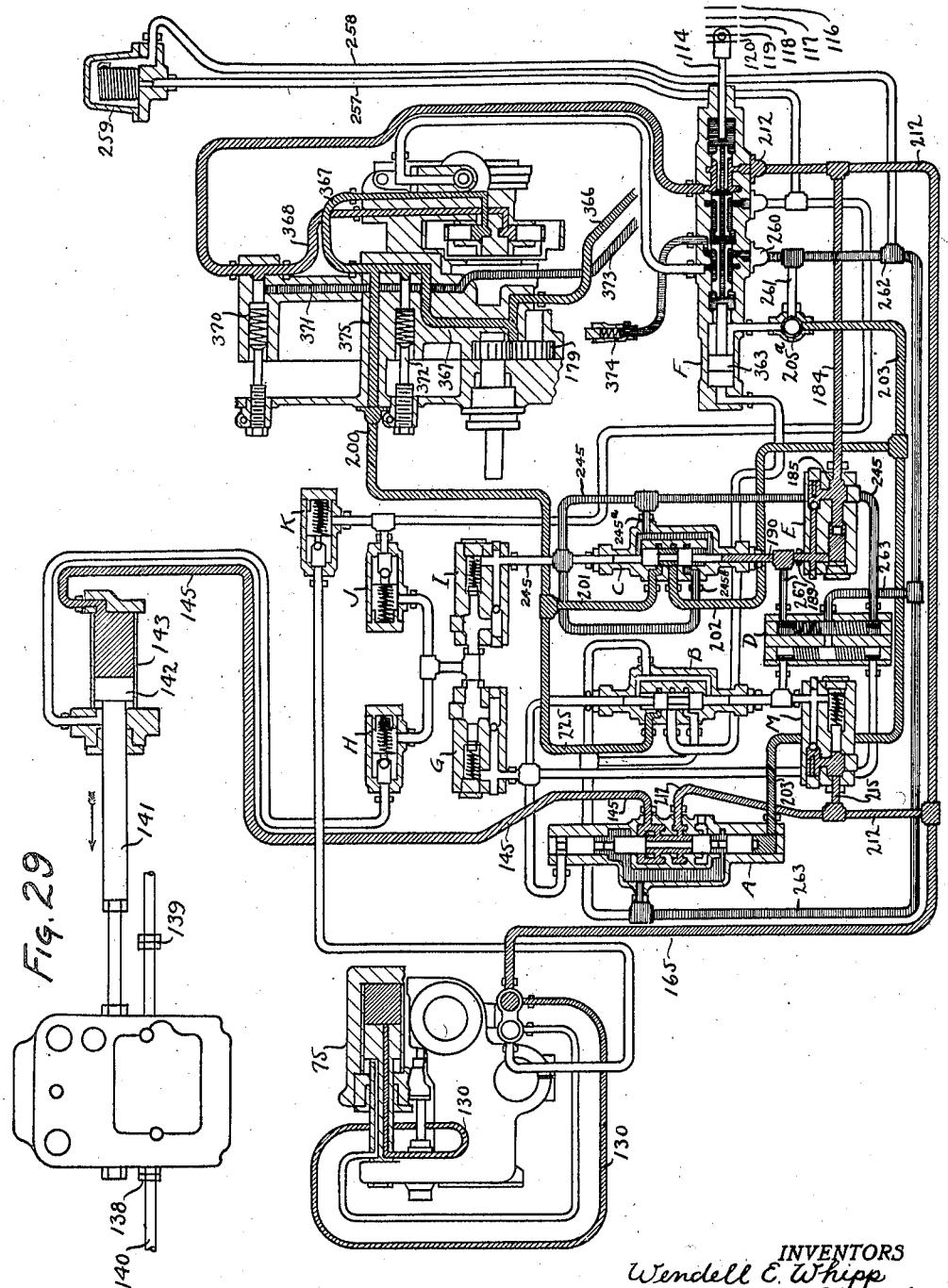

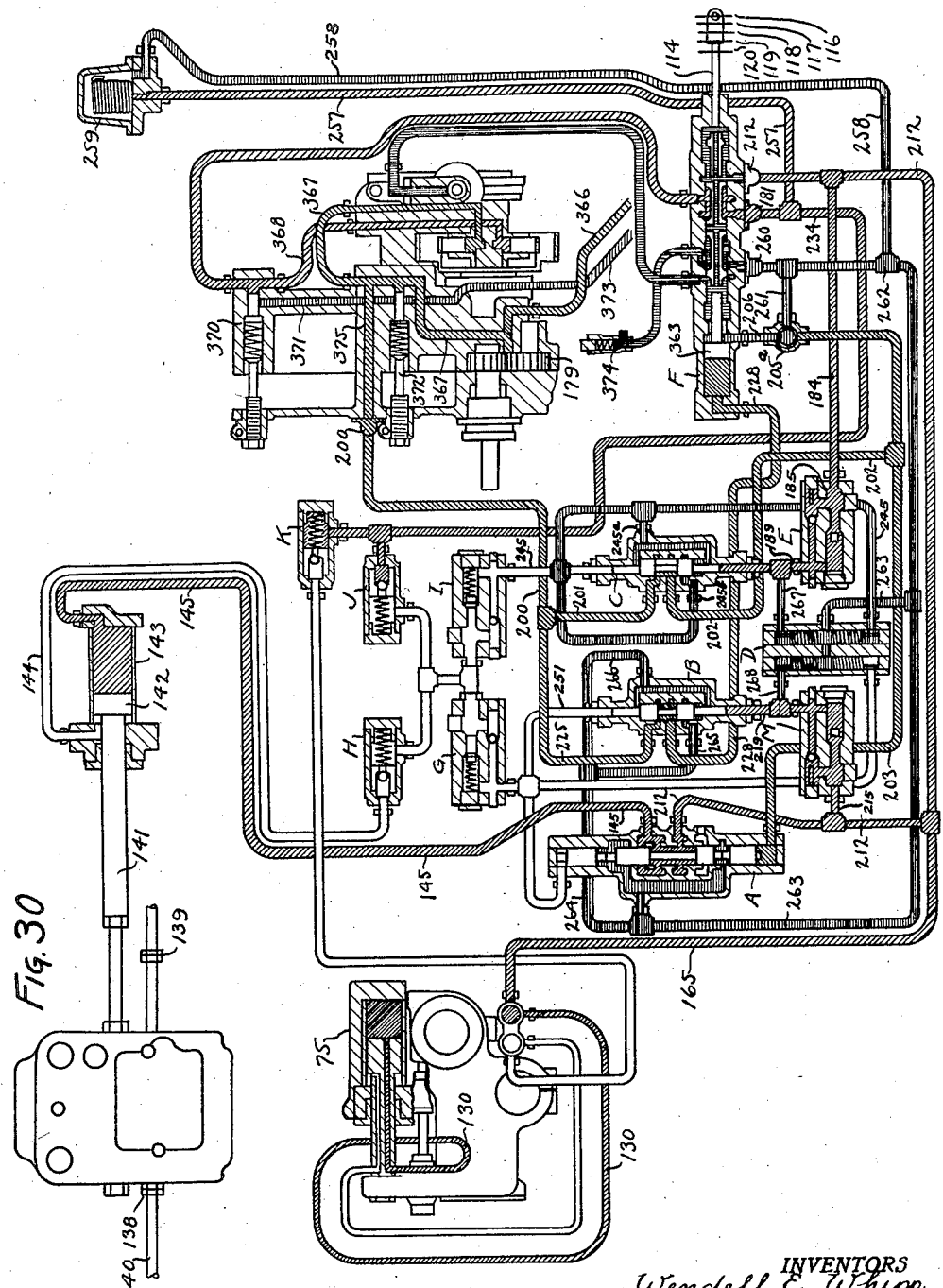

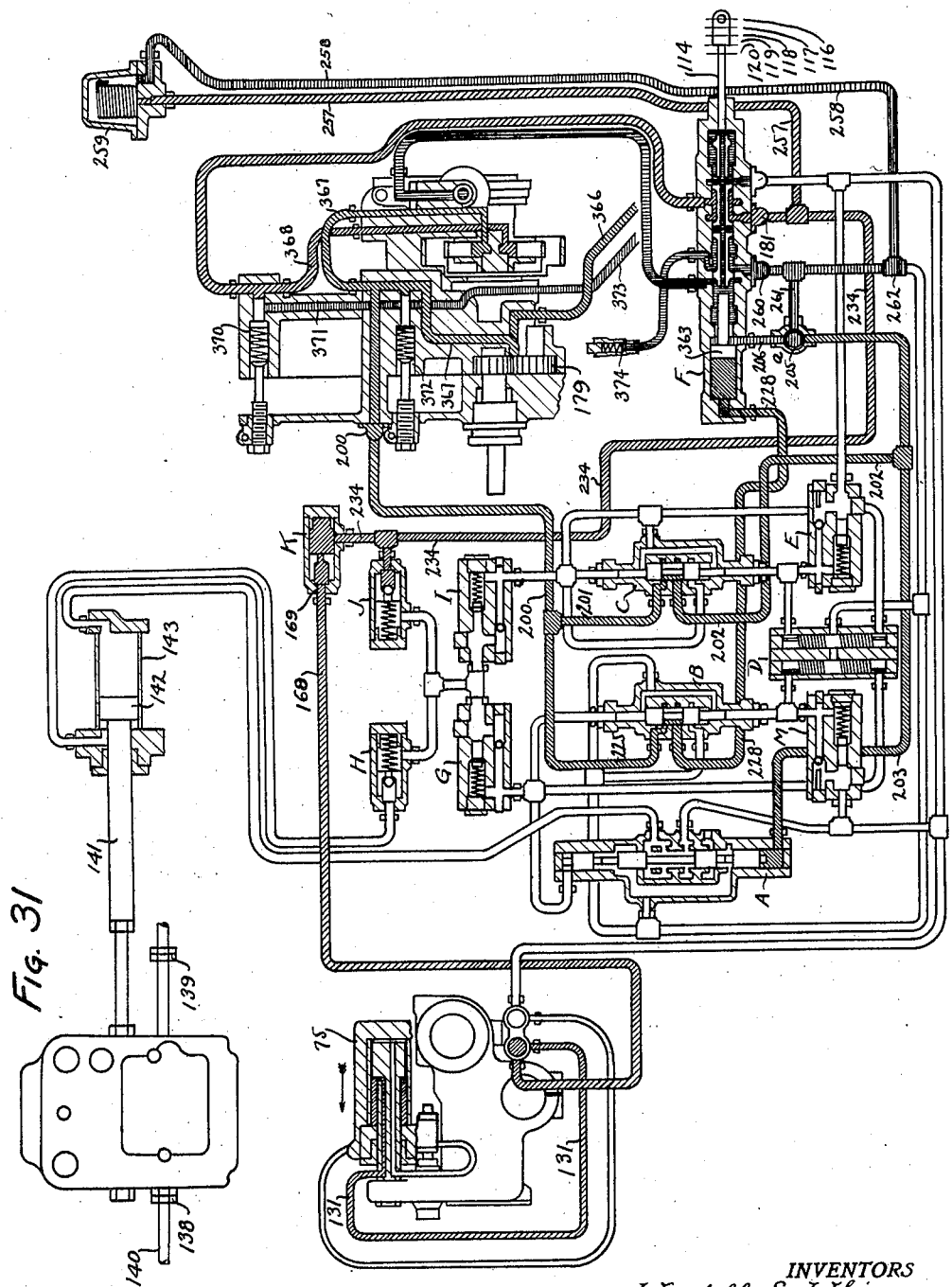

Jan. 14, 1936.  W. E. WHIPP ET AL  2,027,568
LATHE
Filed Oct. 11, 1928  34 Sheets-Sheet 23

INVENTORS
Wendell E. Whipp.
BY Clifford A. Bickel.
Toulmin & Toulmin
ATTORNEY

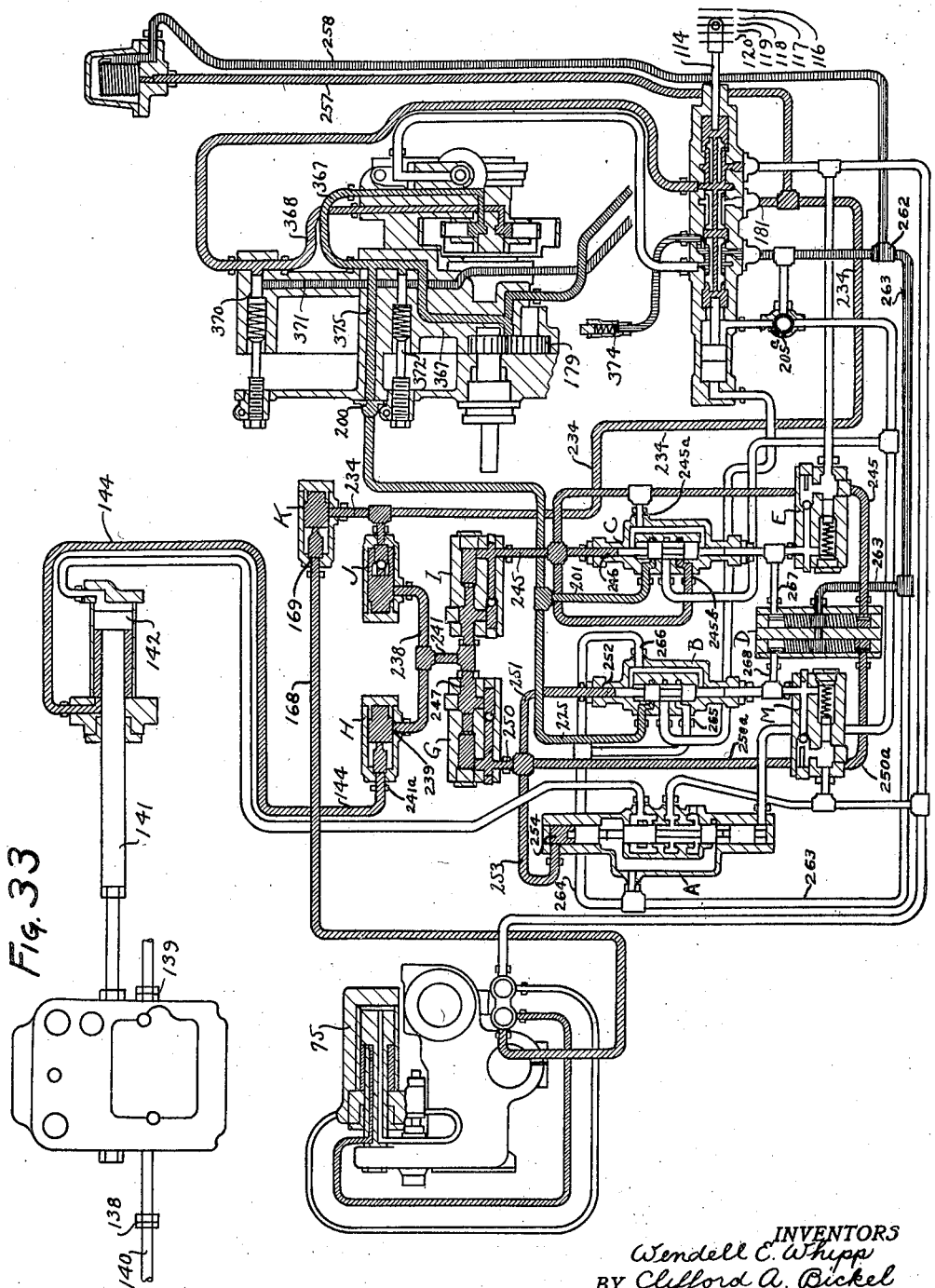

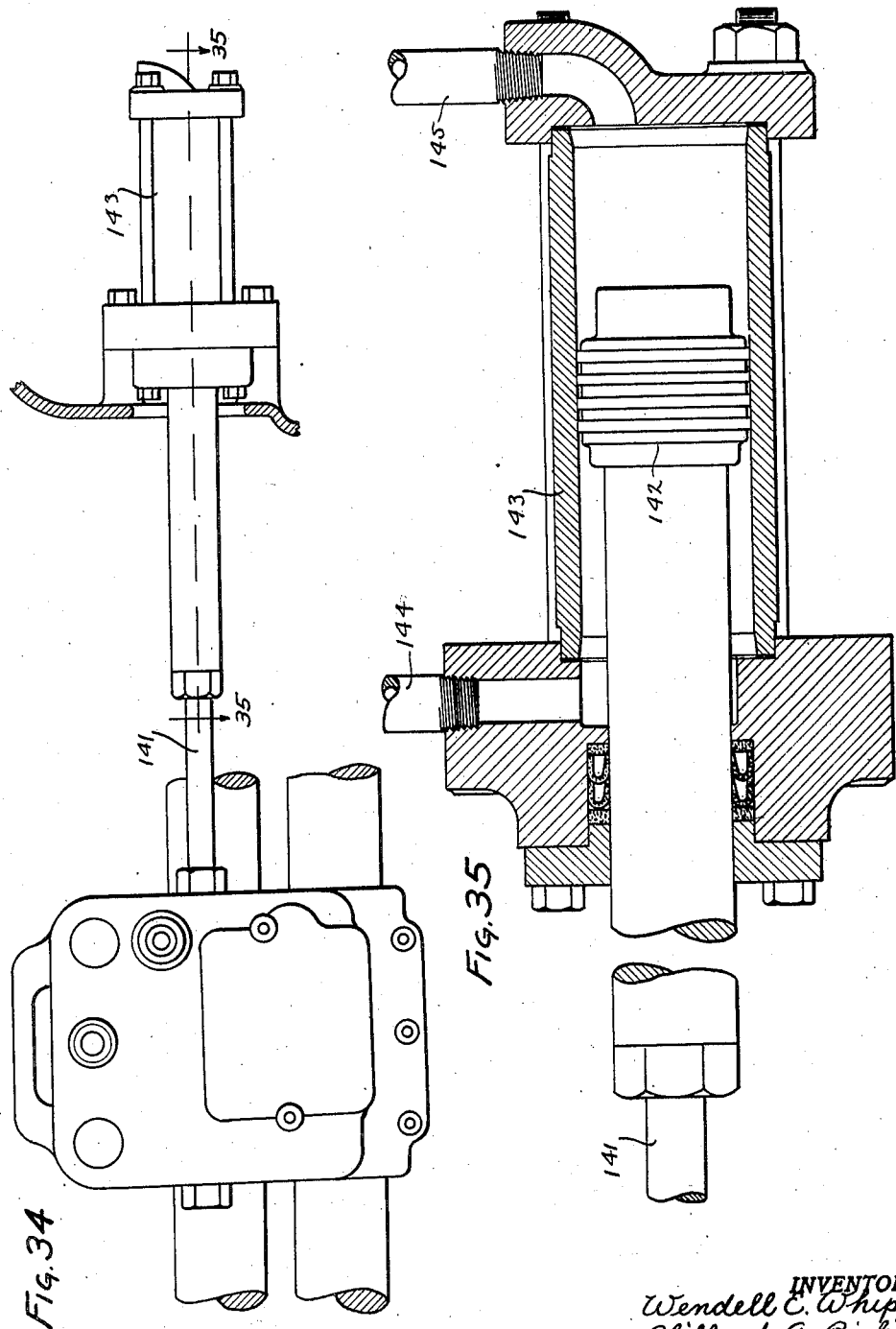

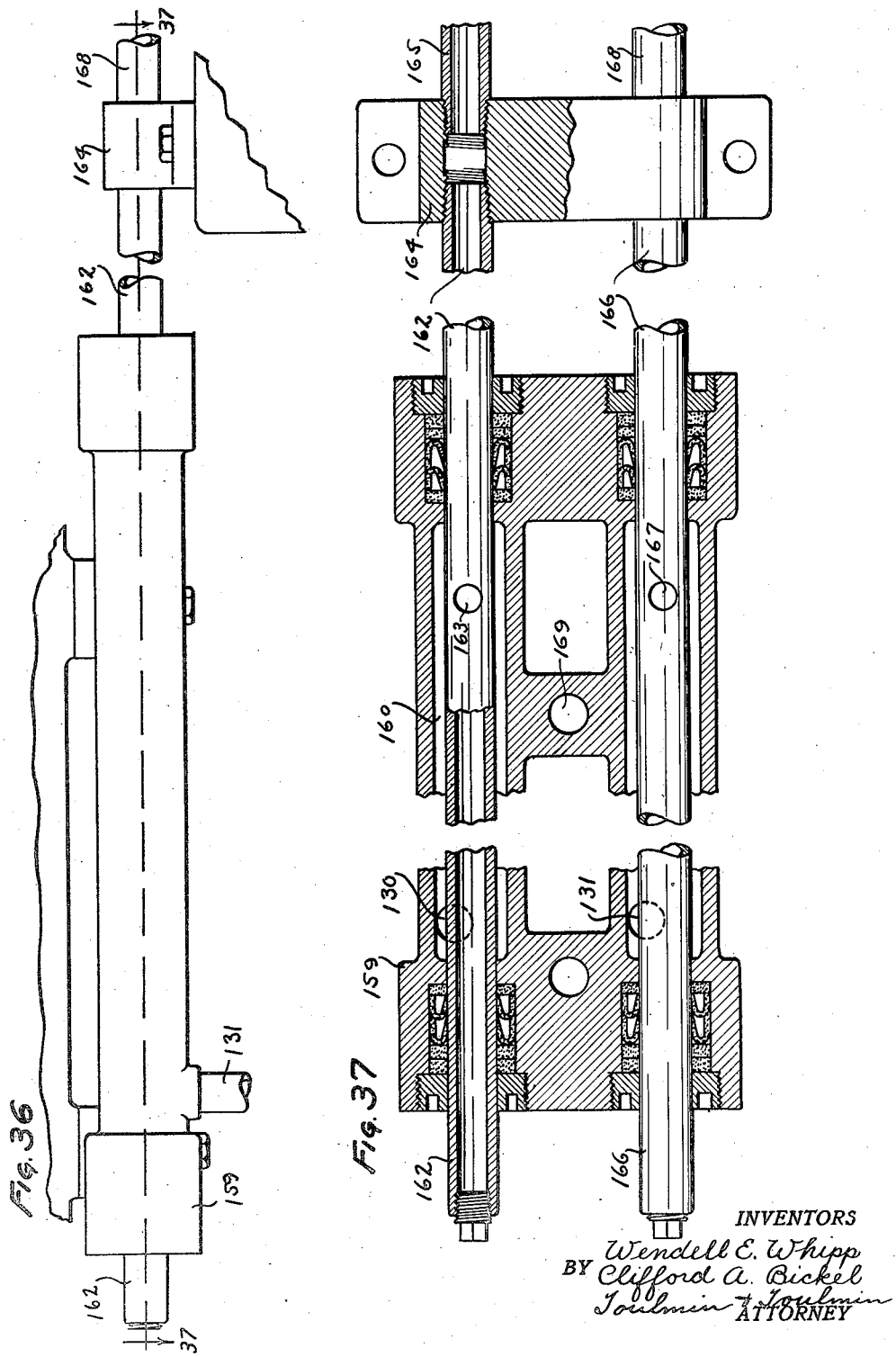

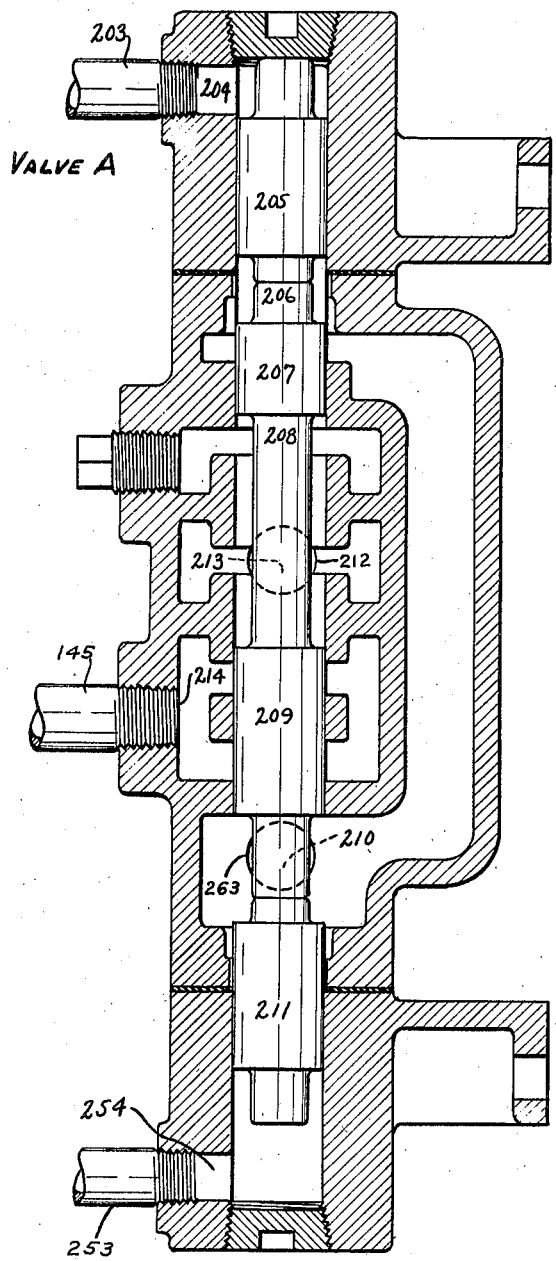

Jan. 14, 1936.   W. E. WHIPP ET AL   2,027,568
LATHE
Filed Oct. 11, 1928   34 Sheets-Sheet 28
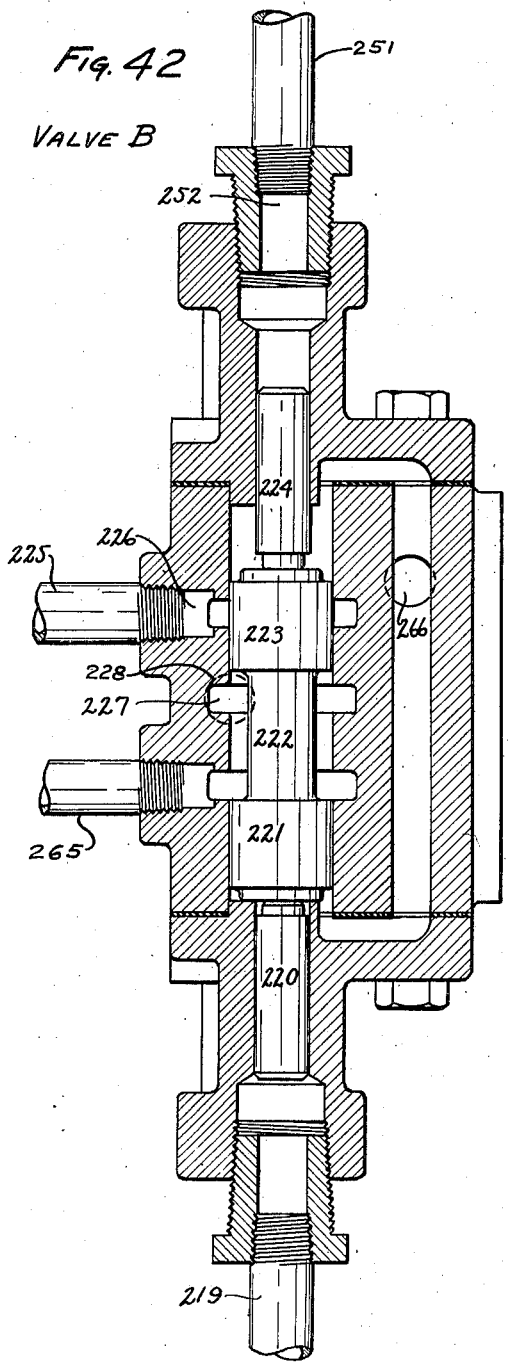
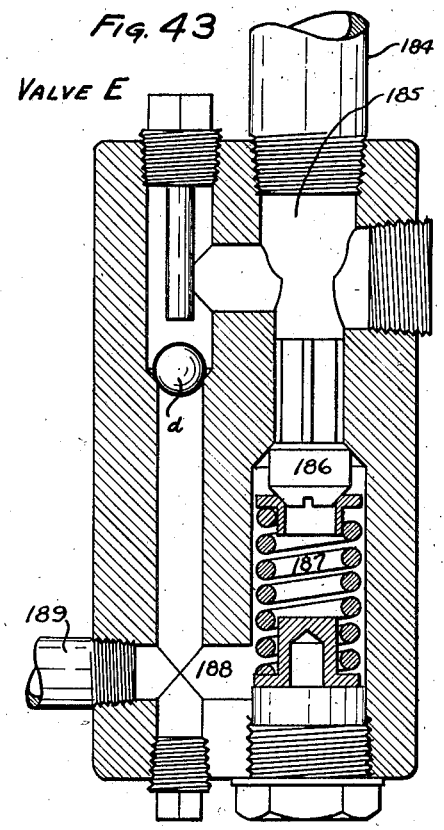
INVENTORS
Wendell E. Whipp
BY Clifford A. Bickel
Toulmin + Toulmin
ATTORNEY Jan. 14, 1936. W. E. WHIPP ET AL 2,027,568
LATHE
Filed Oct. 11, 1928 34 Sheets-Sheet 29
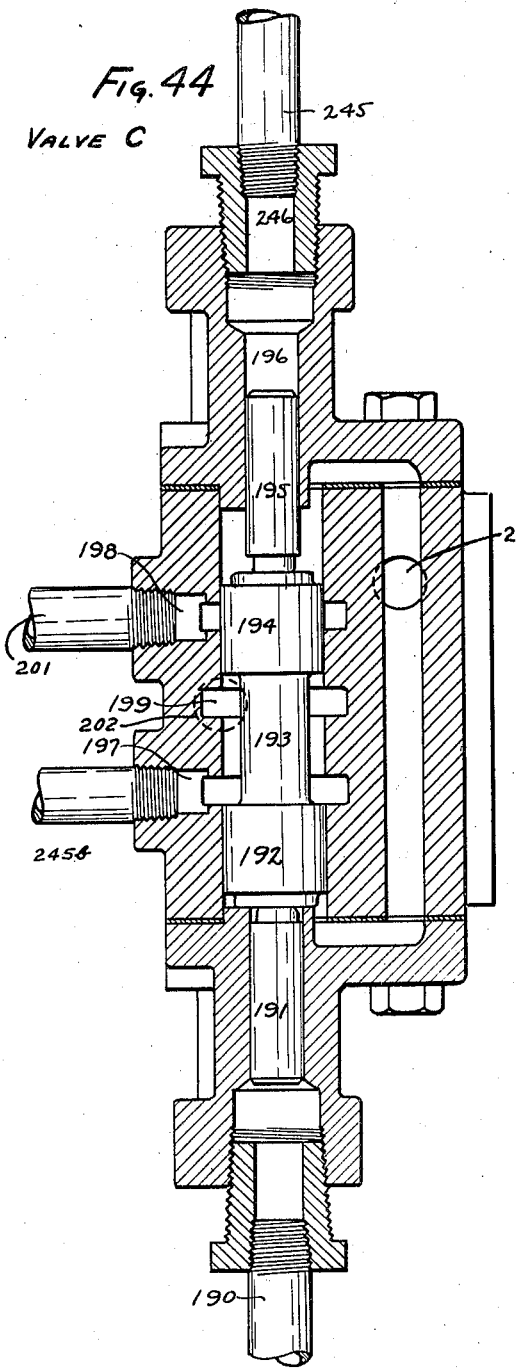
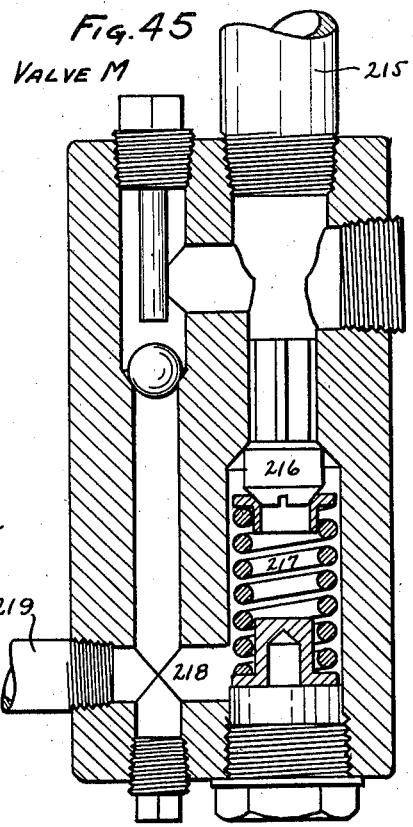
INVENTORS
Wendell E. Whipp
BY Clifford A. Bickel
Toulmin & Toulmin
ATTORNEY Jan. 14, 1936.  W. E. WHIPP ET AL  2,027,568
LATHE
Filed Oct. 11, 1928   34 Sheets-Sheet 30
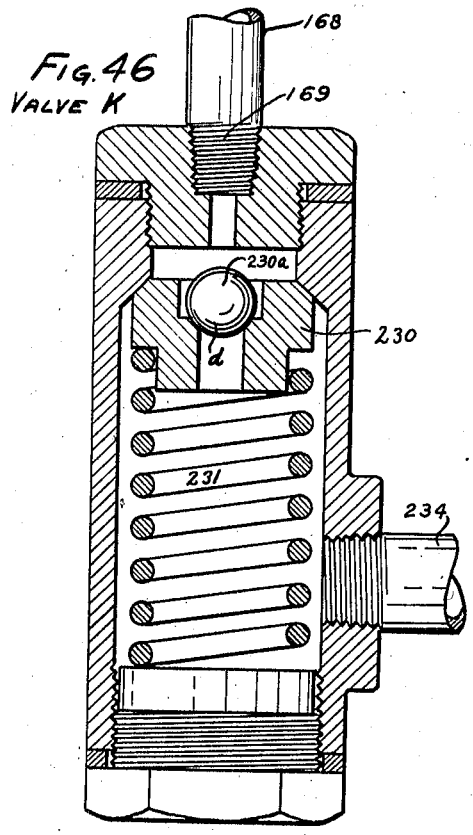
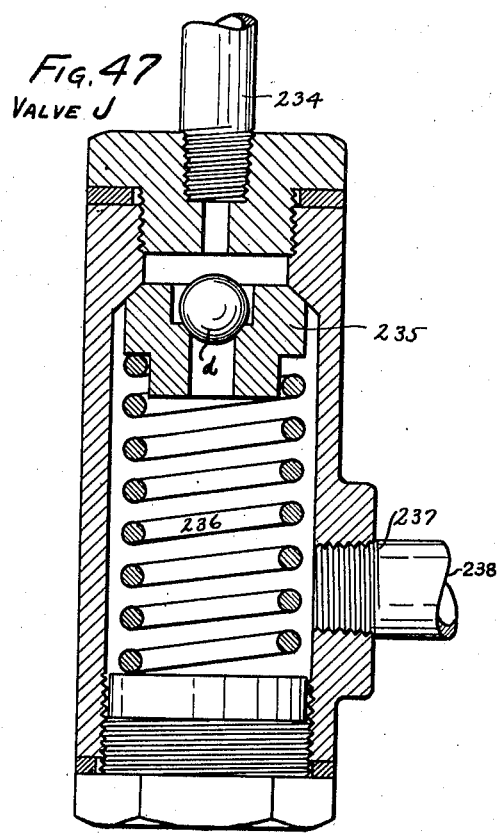
INVENTORS
Wendell E. Whipp
BY Clifford A. Bickel
Toulmin + Toulmin
ATTORNEY Jan. 14, 1936.   W. E. WHIPP ET AL   2,027,568
LATHE
Filed Oct. 11, 1928   34 Sheets-Sheet 31
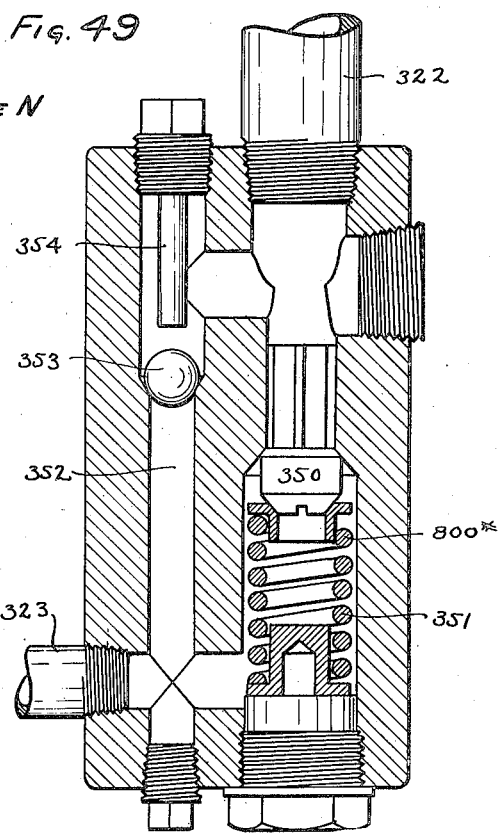
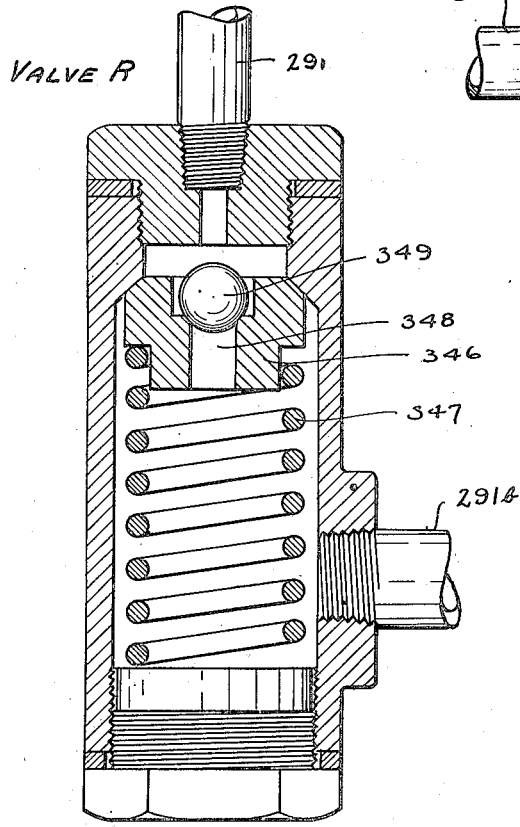
INVENTORS
Wendell E. Whipp
BY Clifford A. Bickel
Toulmin & Toulmin
ATTORNEY

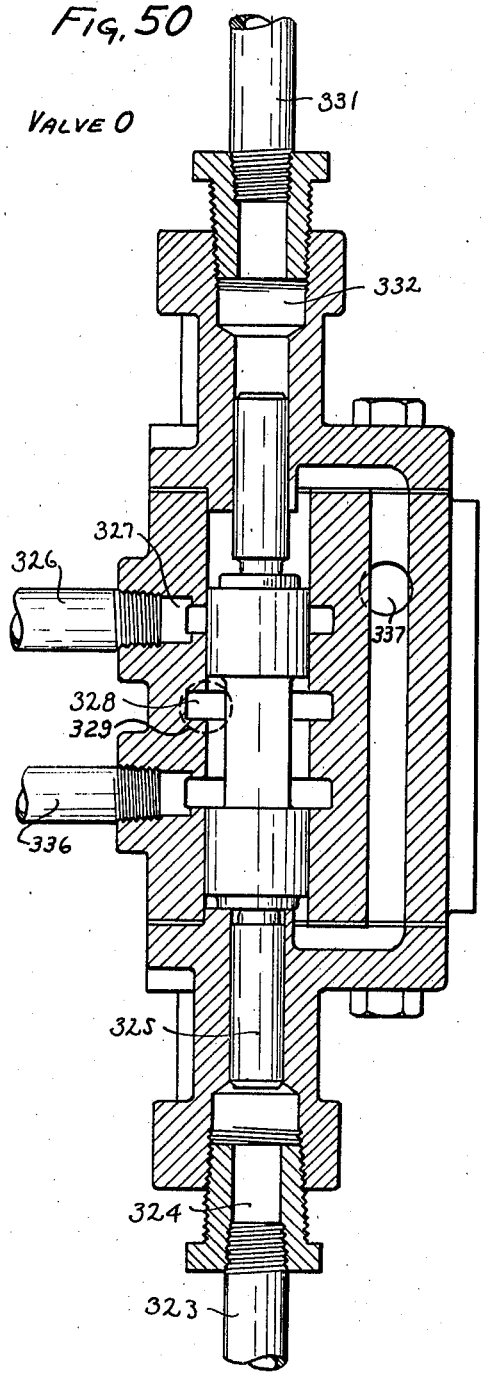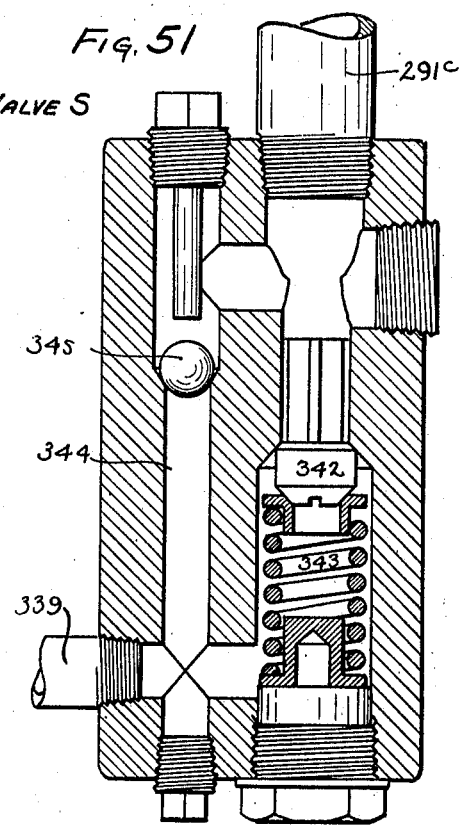

Jan. 14, 1936.　　W. E. WHIPP ET AL　　2,027,568
LATHE
Filed Oct. 11, 1928　　34 Sheets-Sheet 33
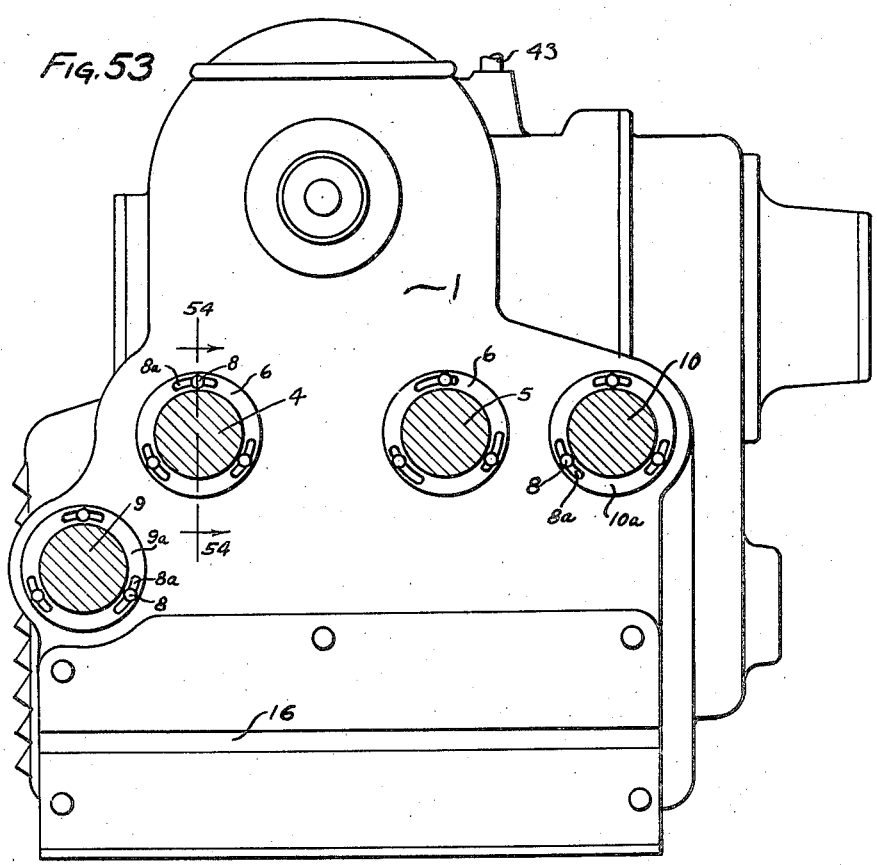
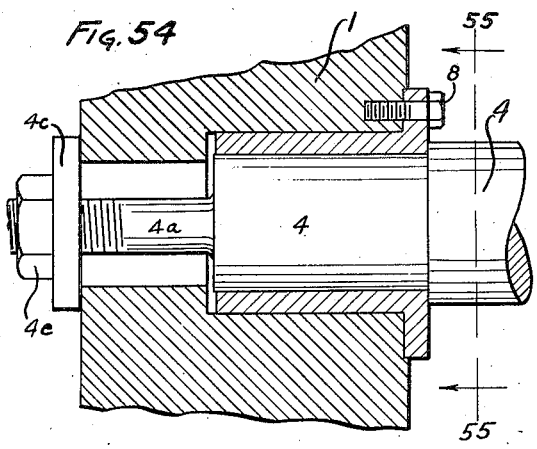
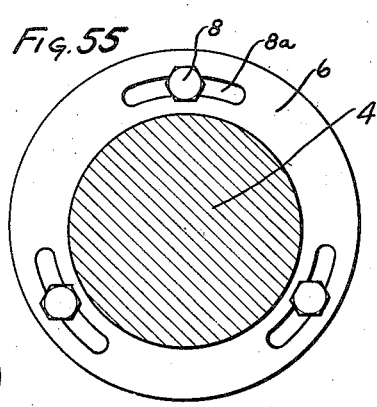
INVENTORS
Wendell E. Whipp
BY Clifford A. Bickel
Toulmin & Toulmin
ATTORNEY Patented Jan. 14, 1936

2,027,568

UNITED STATES PATENT OFFICE 2,027,568

LATHE

Wendell E. Whipp and Clifford A. Bickel, Sidney, Ohio, assignors to The Monarch Machine Tool Company, Sidney, Ohio, a corporation of Ohio Application October 11, 1928, Serial No. 311,729

51 Claims. (Cl. 82—2)

Our invention relates to lathes and, in particular, to a hydraulic control for lathes.

It is the object of our invention to provide a hydraulic control for a lathe in which the tool is brought automatically from inoperative position to the work and then proceeds automatically along the work, then is withdrawn from the work and automatically returned to its initial position ready for another cycle of operations.

It is a further object of the invention to provide independent work driving mechanism and tool advancing and retreating mechanism.

It is a further object to provide a plurality of tool operating mechanisms operable from a common source of power on different parts of the work simultaneously or at different intervals in synchronism with one another.

It is a further object of our invention to provide a three-part lathe construction consisting of a head stock section, a center section and a tail stock section and bar members for connecting said sections, thus eliminating dove tails and other guides which are an integral part of the interconnecting bed and utilizing such bars as supporting guiding members for the tool supports, such bars being readily replacable and of standard section so that they are easily procured for replacement and repair, eliminating the previous necessity of virtually rebuilding the center section of the lathe when its grooves and dove tails become worn.

It is a further object of our invention to provide means of so mounting the tail stock on the interconnecting bars that it will be positively and permanently aligned with the head stock and the work to be supported.

It is a further object to provide a motor housing arranged for suitable ventilation as an integral part of the head stock and tail stock so that there will be no exposed gearing, chains or belts which may cause injury to the operator or impede his rapid operation of the machine.

It is our object to provide a hydraulically-controlled lathe that will be profitable on short runs of work as well as manufacturing in quantities, which is capable of simultaneous turning and facing cuts, the front and rear carriages traveling on round bars capable of longitudinal movement for turning cuts and a cross movement for facing cuts, such movement being arranged for being executed independently or in combination or in any given cycle of movements. The carriages are provided with rapid traverse.

By our invention, we have been able to eliminate the heavy cast iron beds, the dove tail and slide construction thereon, the elimination of integral tool slides of cast iron, thereby eliminating the scraping of feeding operations and the elimination of mal-adjustment of the parts due to the failure to have positive alignment without great weight.

We further eliminate intricate systems of cams and gearing operating through splined shafts which are necessary for timing and tool setting.

It is a further object of our invention to provide vertical tool holders as well as horizontal tool holders, it being possible with our invention to place the tool holders in any desired position or at any desired angle.

Referring to the drawings:

Figure 1 is a side elevation of the lathe;

Figure 2 is a top plan view thereof;

Figure 3 is an end elevation from the left hand end or head stock end of the machine;

Figure 4 is a section on the line 4—4 of Figure 5 showing the head stock drive for the work;

Figure 5 is a section on the line 5—5 of Figure 2 showing the driving mechanism and control for the head stock and the lubricant pump drive;

Figure 6 is a section on the line 6—6 of Figure 5 through the main drive shaft in the head stock showing the clutch and brake mechanism;

Figure 7 is a skeleton view of the control handles, racks and pinions for controlling the tool operating mecahnism;

Figure 8 is a skeleton view partially broken away to show in section the interconnecting round bars between the head stock and the tail stock and the round bar slides that move in the head stock and tail stock with the tool supports;

Figure 9 is a side elevation of the left hand half including the head stock showing one of the horizontally disposed and one of the vertically disposed tool holders;

Figure 10 is a section on the line 10—10 of Figure 9;

Figure 14 is a front elevation with the cover removed of one of the tool holders;

Figure 15 is a section on the line 15—15 of Figure 14;

Figure 18 is a section on the line 18—18 of Figure 15;

Figure 19 is a plan view of the longitudinal movement cam;

Figure 20 is a plan view of the transverse movement cam;

Figure 21 is a detail side elevation of the tail stock;

Figure 22 is a section on the line 22—22 of Figure 21;

Figure 23 is a schematic view of the hydraulic control mechanism as applied to one of the horizontal tool holders showing the parts in an isometric perspective;

Figure 25 is a sectional view of the hydraulic control valve with a showing of the diagrammatic arrangement of the pumps and associated piping;

Figure 26 is a side elevation of the mechanical operating mechanism of the tail stock end of the machine showing in particular the pump controls for the respective pumps and respective oppositely disposed horizontal tool holders;

Figure 27 is a section through the air drain of the hydraulic line;

Figure 28 is a diagrammatic view showing the position of the parts of the valves when the horizontal tool holder is moving in forward transverse position;

Figure 29 is a similar view when the parts are moving in forward longitudinal position;

Figure 30 is a similar view showing the parts moving in traverse position;

Figure 31 is a similar view showing the parts where the tool holder is being returned transversely of the machine;

Figure 33 is a detail view showing the parts in a neutral at-rest position;

Figure 34 is a detail view of the hydraulic cylinder arrangement for imparting a longitudinal movement of the tool holder;

Figure 35 is a section on the line 35—35 of Figure 34;

Figure 36 is an elevation of the hydraulic distribution manifold for distributing the oil pressure irrespective of the position of the tool holder;

Figure 37 is a section on the line 37—37 of Figure 36;

Figure 38 is a vertical section through valve A;

Figure 39 is a vertical section through valve H;

Figure 40 is a vertical section through valve I;

Figure 41 is a vertical section through valve G;

Figure 42 is a vertical section through valve B;

Figure 43 is a vertical section through valve E;

Figure 44 is a vertical section through valve C;

Figure 45 is a vertical section through valve M;

Figure 46 is a vertical section through valve K;

Figure 47 is a vertical section through valve J;

Figure 48 is a vertical section through valve R;

Figure 49 is a vertical section through valve N;

Figure 50 is a vertical section through valve O;

Figure 51 is a vertical section through valve S;

Figure 52 is a vertical section through one end of the tie bar eccentric bushing support;

Figure 53 is a section on the line 53—53 of Figure 2;

Figure 54 is a section on the line 54—54 of Figure 53;

Figure 55 is a section on the line 55—55 of Figure 54;

General construction

Figure 11:
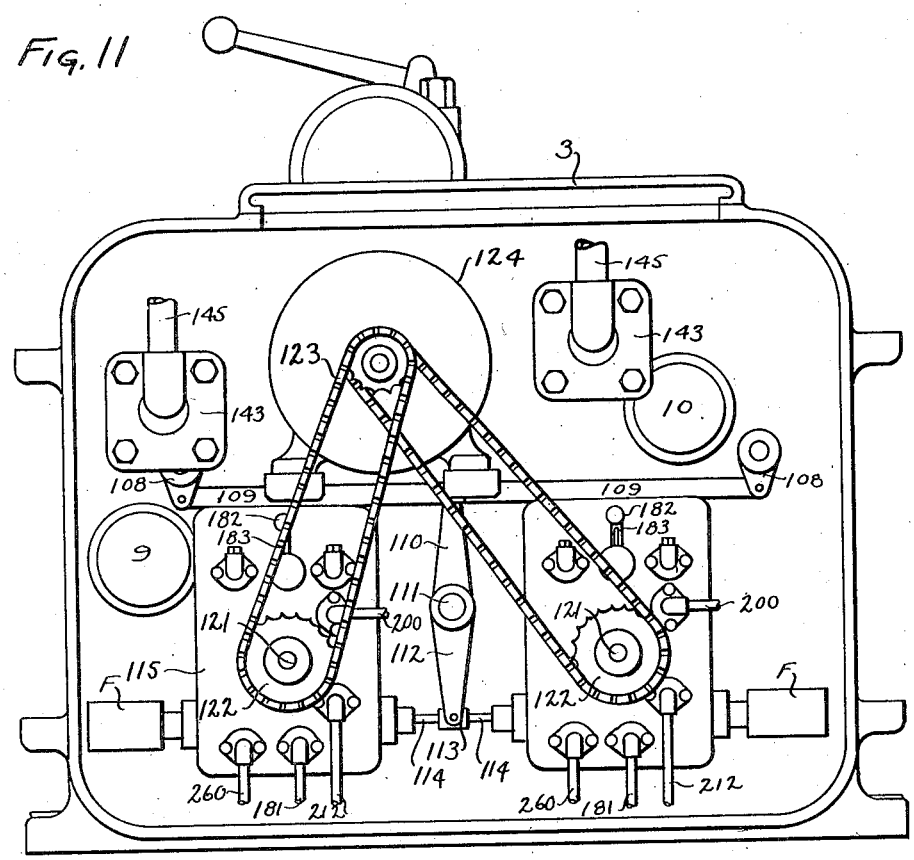
Figure 11 is a section on the line 11—11 of Figure 2 showing the arrangement of the motor drive for the pumps.

The lathe consists of three major sections each independent of the other, such as—a head stock section, an intermediate pan or center section, and a tail stock section.

The head stock section is generally designated 1, the center pan section generally designated 2 and the tail stock section 3. These several sections are joined together by solid or hollow round bars or tubes, two of which numbered 4 and 5, are stationarily anchored in the eccentric receiving sleeves 6 and 7 of the head stock housing and pump housing respectively by the screw bolts 8 in slots 8a (see Figure 53). Other similar bars 9 and 10 are slidably mounted in the sleeves 11 and 12 in the head stock and pump housings and travel with the horizontally disposed tool holders hereinafter described (see Figure 8). Eccentric bushing sleeves 9a and 10a retained by bolts 8 in slots 8a support these bars 9 and 10. The eccentricity of these bushings is one sixty-fourth of an inch. The rotation of them is adjusted by the screw bolts 8 in the slots 8a. Threaded reduced ends 4a and 4b are provided with clamping plates 4c and 4d held in position by nuts 4e to clamp the structure together. 4f is a clamping and positioning collar for bars 4 and 5 (see Figure 52).

The center or pan section is provided with end walls 13 that have in their faces transverse grooves 14 for receiving a square locking bar 15 which is likewise located in a similar opposed groove 16 in the respective adjacent faces 17 and 18 of the tail stock and the head stock.

This square bar serves to align the head stock casing, the tail stock casing and the center or pan section. Bolts 19 serve to further maintain this alignment between the center section and the adjacent end sections.

The center section itself, as will be seen in Figure 10, has a bottom wall 20, side walls 21 and a top wall 22 having perforations 23 through which the lubricant drains having been caught in a curved top wall 22. This center section furthermore serves as the support for the cam brackets 24 on the front and rear of the machine which are retained thereon by the bolts 25. The head stock section or housing contains the motor for driving the work support spindle and associated mechanism. The tail stock section has the tail stock mounted adjacent thereto on the supporting rods 4 and 5 and also contains the hydraulic control mechanism pumps and motor therefor.

Work drive mechanism

Referring in detail to the head stock section and in pariticular to the work drive mechanism, it will be seen in Figures 3, 4, 5 and 6 that the head stock housing is provided on the front and rear with a series of louvers 26 to provide ventilation for the motor 27 that actuates the mechanism for rotating the work and that actuates the lubricant pump 28.

This motor 27 is provided with an armature shaft 29 on which is mounted a pair of sprockets 30 and 31. The sprocket 30 drives the chain 32 which in turn drives the sprocket 33 and the main power shaft 34 on which it is mounted. The method of this mounting is as follows:

The sprocket 33 is immediately mounted upon ball bearings 35 on the shaft 34. It is clutched to the shaft 34 by the clutch 36 and controlled in its spinning by the brake 37 to the action of the clutch shifting, internally disposed shaft 38 which is actuated by the pin 39 working in the slot 40 that is in turn actuated by the sleeve 41 which carries the pin 39. This sleeve is actuated by the cam finger 42 carried on the operating shaft 43 which is controlled by the starting and stopping handle 44. On the other end of the shaft 34 is mounted a gear 45 which meshes with a pinion 46 on the shaft 47. On this shaft is a worm 48 that drives the worm gear 49 mounted on the work spindle shaft 50 journaled at 51 and 52 in the housing 1 of the head stock. This shaft 50 is provided with a spindle or threaded nose 53, to which work drivers and chucks 54 may be attached.

*Lubricant pump*

The lubricant pump 28 is driven by the chain 55 from the sprocket 31. This chain 55 is mounted on a similar sprocket 56 on the pump shaft 57. The outlet of the pump is designated 58 and the inlet line designated 59. This inlet line communicates with the interior of the center section where the lubricant collects. The end of the inlet line 59 which is the inlet to the pump is provided with a strainer 60 located in the bottom of the center or pan section.

*Tail stock*

Referring in particular to Figures 21 and 22 it will be noted that the tail stock is mounted upon the stationary connecting bars that are numbered 4 and 5. These large round bars support the upper half of the tail stock designated 61. They are rigidly in line with the head stock housing and therefore the tail stock is maintained in rigid alignment with the head stock. The support 61 for the tail stock is provided with a pair of arms 62 and 63 that in turn support the tail stock cylinder proper 64, the tail stock spindle 65, the center 66 and the air cylinder 67 and the tail stock spindle binder handle 68. Either the air cylinder 67 for an air operated movement may be employed or the tail stock can be operated manually with a large diameter hand wheel and screw. The air cylinder is shown with an air line 69 and control handle 70. But the details of this construction are not important as they form no part of the present invention.

This tail stock support 61 is provided with an underlying tail stock clamp 71 which is retained thereon by the bolts 72 and the bolts 73. A vertically disposed supporting web 74 is provided between the support 61 and the cylinder 64. Thus, the tail stock may be clamped in perfect alignment anywhere along the bars 4 and 5. The work is held between the work supports or centers 54 and 66.

*Horizontal tool support*

The horizontal tool support consists of a tool supporting bed 75 on which tools are supported in the usual manner. This bed has formed in it as an integral part thereof a cylinder 76. It is provided with a pair of spaced depending guide sleeves 77 which are mounted upon round guide bars 78 arranged transversely of the longitudinal axis of the lathe. These bars are carried in upstanding ears 79 and 80 on opposite sides and opposite ends of the tool supporting bed 81.

Midway between the sides of this bed and mounted on the upper surface thereof beneath the tool support is a stop designated 82. This stop is adapted to engage with the end of the micrometer adjusted stop shaft 83, the exact adjustment of which will be hereinafter explained. This shaft 83 is carried by the tool support and travels with it so that the adjustment of it will determine the transverse movement of the tool and the tool support in one direction.

This tool support is further provided with a horizontally disposed rack 84 which is provided with vertically arranged teeth 85 on one side thereof. These teeth in turn mesh with a pinion 86 that is mounted on a vertical pinion shaft 87 carried by the tool support bed 81. The lower end of this shaft 87 is provided with a second similar pinion 88 which meshes with a horizontally disposed rack 89 that is arranged parallel to the longitudinal axis of the lathe. It also has vertically disposed teeth on one side thereof for engaging with the pinion 88. The rack 89 is attached to the cam support 90 which has on its under side a cam consisting of a straight sided cam 91, a raised cam 92 and a second spaced straight sided cam 93. This cam support 90 acting as a cover supporting the cams and carrying the rack 89 is slidably mounted upon the supports 94 and 95. The cams 91, 92 and 93 are contacted by the cam roller pin 96 carried on one arm of the yoke 97 that is pivotally mounted at 98 upon the tool supporting bed 81. The other arm of this yoke carries a cam pin 99 that engages with the straight sided cam 100 and the raised surface cam 101 that are mounted upon the cam supporting bracket 24. This yoke 97 is provided with a segmental rack 102 that in turn engages with a rack bar 103 having teeth on the side thereof 104. This rack bar 103 also has teeth 105 which mesh with a pinion 106 on the valve control rod 107.

This pinion 106 is caused to rotate with the shaft 107 as it is keyed thereto by the keyway 107a and the key 107b (Fig. 15). The pinion is mounted between the shoulders 106a of the tool supporting bed 81. The rack 103 is likewise slidably supported in a sleeve 106b.

This valve control rod 107 is provided with an arm 108 to which is pivotally mounted a pitman 109 that in turn is pivotally connected to a second arm 110 mounted on the shaft 111 which carries at its extreme end a depending lever 112. This lever is pivotally connected at 113 to the valve pin 114 which operates in the pump housing generally designated 115. This valve pin 114 or valve with its associated mechanism is adapted to assume as indicated five positions. When it is located in the position indicated at 116 it is in traverse reverse, at 117 at feed reverse, at 118 at neutral, at 119 at feed forward and at 120 at traverse forward. The significance and importance of these varying positions will be explained hereinafter.

*Pump mechanism*

The pump housing 115 contains two pumps, an oil pressure pump of the gear type and a high pressure pump of the plunger type, which are driven from the common pump shaft 121 from the sprocket 122 and belt 123 from the common motor 124. This pump mechanism will be explained in detail in the appropriate place.

*Mechanism for tool support traverse*

Figure 16:
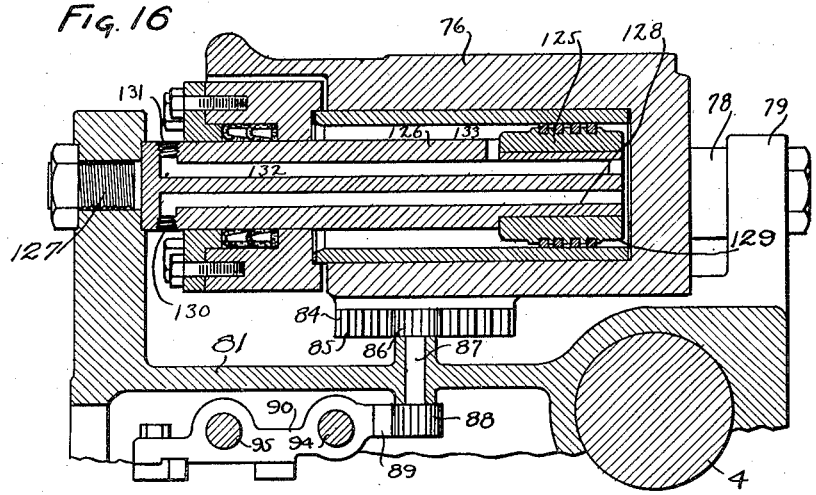
Figure 16 is a section on the line 16—16 of Figure 14.
Figure 17:
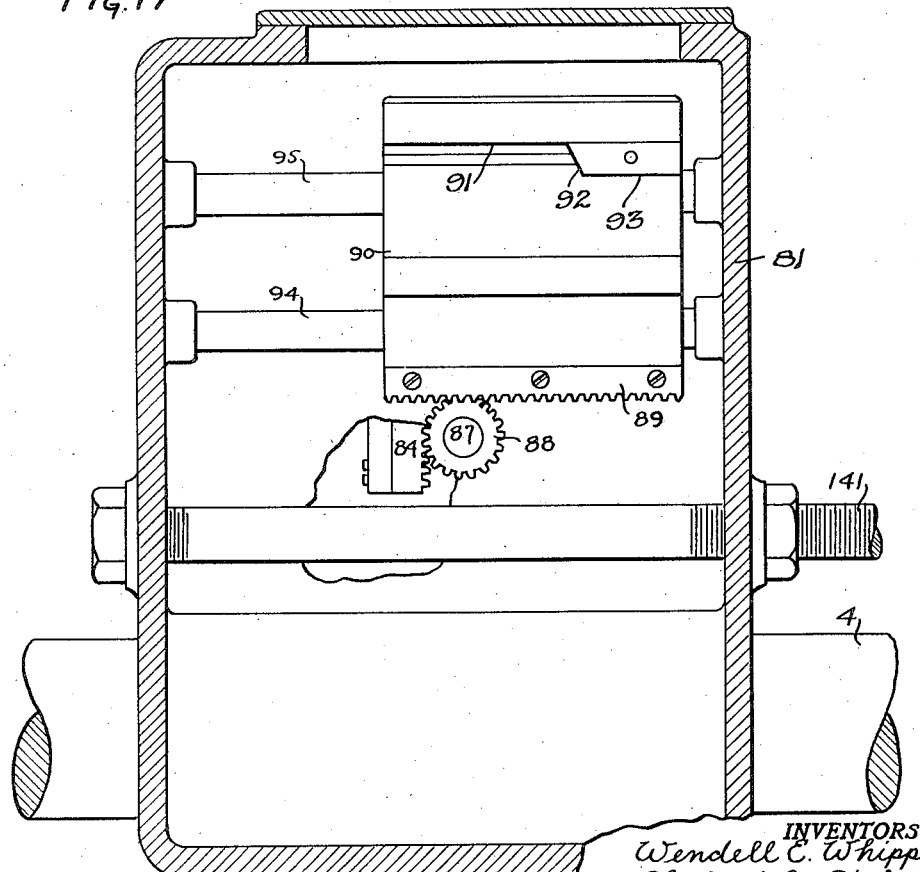
Figure 17 is a section on the line 17—17 of Figure 15.

Returning to the tool support, it will be noted Figure 16 that it is provided with a piston 125 operating in the cylinder 76. This piston is carried upon a stationary piston rod 126 that is mounted at 127 upon the outside end of the tool supporting bed 81. A passageway through this piston rod designated 128 conveys a hydraulic medium to the area between the outer end of the piston 125 and the cylinder 76 into the cylindrical chamber generally designated 129.

This passageway 128 communicates with the pipe 130. A second pipe 131 communicates with a second passageway 132 in the piston rod 126. This passageway 132 discharges into the space behind the piston 125 into the area generally designated 133.

The tool supporting bed 81 slides on the rod 4 or 5 depending on which side it is on the machine. It is clamped to either the rods 9 or 10 by the clamp bolts 134 or 136 (see Figure 10).

These bolts 136 are provided with clamping members 137. The heavy iron rods or cylindrical members 9 and 10 therefore move with the tool supporting bed or carriage and they are in turn slidably mounted as described in the head stock casing and the pump casing as will be more fully shown in Figure 8 where they will be seen mounted in the sleeves 11 and 12.

The movement of this tool supporting bed or carriage is limited by the stops 138 and 139 mounted on the rod 140, the ends of which rod are carried in the head stock casing and the pump housing.

Mechanism for moving tool supporting bed longitudinally of machine

A piston rod 141 is mounted in the side of the tool support bed 81 and carries on its end a piston 142 (Figure 23) working in the cylinder 143 carried by the pump housing. This cylinder is provided with a delivery pipe 144 behind the piston and a delivery pipe 145 in front of the piston.

It will be understood that the horizontal carriages on both sides comprising the tool supporting bed and tool support with associated mechanism are exactly alike and therefore similar numerals indicate similar parts.

Adjustable stop mechanism for tool support

The tool support adjustable stop mechanism can be seen in section in Figure 15. The micrometer head 146 is mounted on the sleeve 147 in the tool supporting bed 81. This sleeve carries the depending pin 148 that extends into a groove 149 in the threaded adjusting member 150. This threaded adjustment member carries a lock nut 151 and is threaded within a sleeve 152 that is a part of the lower portion of the tool support. This portion of the tool support is designated 153 and constitutes a depending ear. On the other side of this ear is a second lock nut 154 mounted upon the threaded member 150. The end 83 of this threaded member 150 is adapted to engage with the stop 82 on the tool supporting bed 81. By loosening the nuts 151 and 154 a micrometer adjustment of this stop screw 150 may be made to bring the end thereof 83 in proper position. The nuts 151 and 154 may then be turned into locking or clamping position.

Tool support rod adjustments

The tool supporting rods 78 are provided with sleeves 155 which are clamped by the clamp nuts 156 and 157 within the tool support so as to travel with it. By loosening the lock nut 158 these clamping nuts 157 and 156 may be loosened and the tapered sleeve adjusted within the tool support.

Hydraulic pressure distribution mechanism

Due to the fact that the hydraulic pressure which is supplied to the cylinder 76 must be applied irrespective of the longitudinal position of the tool supporting bed it is necessary to provide some form of distribution manifold for the respective ends of the cylinder 76 on either side of the piston 125.

In order to effect this object, I have provided that the pipes 130 and 131 will be led to the manifold casing generally designated 159 (see Figures 23 and 37). This casing consists of a pair of spaced heads between which are a pair of tubular chambers 160 and 161. 160 communicates with the pipe 130. Slidably mounted within it and through the heads of the manifold 159 is a stationary distribution pipe 162 having a port 163 emptying into the chamber 160. This pipe is stationarily mounted in the bracket 164 that is suitably mounted on the pump housing. The pipe 165 communicates therewith and is mounted in the same bracket. Likewise, the chamber 161 into which the pipe 131 empties is provided with the sliding pipe 166 having the port 167 emptying into the chamber 161. It is likewise mounted in the bracket 164 and there communicates with a pipe 168 that is also attached to the bracket 164. The distribution manifold 159 is supported by suitable bolts through the apertures 169 upon the tool support bed 81 so that it travels with it. Thus, hydraulic pressure is furnished to the tool supporting cylinder irrespective of its longitudinal position on the lathe.

Hydraulic control

The hydraulic control is operated through the handle 170 which is adapted to assume the neutral position at 171, the traverse forward position at 172 or the traverse reverse position at 173. This handle 170 is mounted upon the pivotal support 174 and carries on its lower side a segmental rack 175 which engages with the upper surface of a rack rod or bar 176 carrying the teeth 177. Similar teeth are provided on either end of this bar and with such teeth engage the pinions 178. Thus, the movement of a single handle on the front of the machine will serve to operate the mechanism for both tool supports, each tool support consisting of the tool supporting bed with associated mechanism. The pinion 178 is mounted upon the rod 107 which controls through the linkage 108, 109, 110, 112 and 113 the valve pin 114 of the pump housing 115. By pulling the traverse forward lever towards the operator the cycle of operation is started. The mechanism can be brought to neutral position or traverse reverse as indicated if desired in case of accident or for other reasons.

It will be understood that two pumps are provided and while the common control handle 170 operates through a common rack bar 176 both carriages through the hydraulic mechanism which the pump supplies, yet each pump is independently operated from its own train of mechanism on opposite sides of the machine.

The pumps are driven from a common source of power but may be driven from an independent source of power if desired.

Operation of hydraulic carriage mechanism

Briefly, the general scheme of operation of the hydraulic mechanism is to move the tool support in a manner that the tool is first moved into the work by the tool support advancing transversely of the machine until the tool engages the work, the tool is then fed into the work, the tool support including the tool supporting bed is then moved at feeding speed along the work longitudinally, and upon the accomplishment of this movement, the tool support and tool is moved rapidly away from the work, and their whole structure is moved back longitudinally of the machine to its initial position. All of these movements take place through a combination of hydraulic mechanism and mechanical parts automatically from the time that the control lever 170 is set. Provision is also made under some circumstances for a rapid traverse of the tool from point to point longitudinally of the work where the nature of the work being done will permit of such an arrangement. The operation of this mechanism in detail is as follows, as will be apparent from the following description of the hydraulic mechanism in combination with the mechanical parts already identified.

*High and low pressures*

Figure 13:
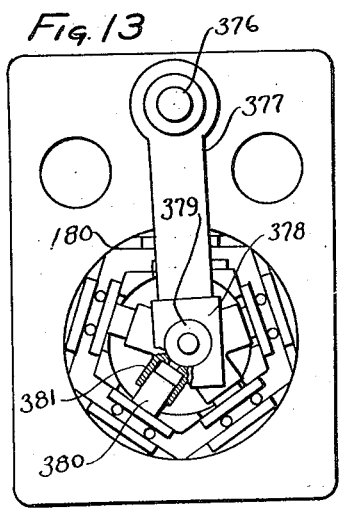
Figure 13 is a view of the high pressure pump with the cover removed.
Figure 12:
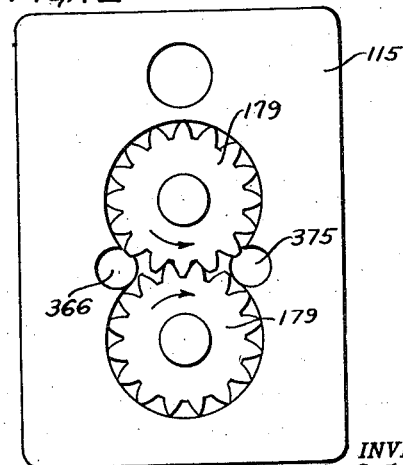
Figure 12 is a front elevation with the cover removed of one of the pumps showing the low pressure pump.

The pump housing designated 115 contains two types of pumps interconnected with each other and driven from a common source of power as described. One of these pumps is a low pressure gear pump 179 and the other is a high pressure plunger pump designated 180 (see Figures 12, 13 and 25). The high pressure plunger pump will deliver pressure at approximately 1050 pounds and the gear pump at 125 pounds. In Figure 25 the relative relation of the pumps is illustrated. In connection with the pumps there is shown a longitudinal section of the valve F with the operating stem 114. As shown in this figure, the high pressure oil is by-passed through the valve 372 and the pipe 373 to the sump 375, thereby relieving pressure from the pipe 212. Though this pipe is maintained full of oil, no pressure is exerted on the oil sufficient to opperate any part of the mechanism.

The outlet pipes 181 and 212 are for the high pressure oil used in the hydraulic system from the plunger pump. Each of the pipes 181 and 212 serves as a return pipe as well as a pressure pipe. The outlet 212 communicates with the pipe 165 whence the oil pressure passes through the pipe 162, the manifold chamber 160, pipe 130 to the forward end of the cylinder 76 in the area 129 in front of the piston 125 having a discharge in that area through the discharge port 128. This serves to move the tool support with the tool into engagement with the work. This oil has been permitted to flow in the lines indicated by the movement of the control lever 170 to position 172 which has in turn resulted in moving the valve stem 114 and its valve to position where the high pressure oil will flow through the pipes 212 and 181, 165 etc. causing the feed cylinder to move forwardly at a differential advance or rapid transverse movement. This movement also throws the cam follower 96 against the cam 91. Then the cam follower 96 engages the cam 92. The result is that this movement of the follower 96 is transferred through the cam 92, yoke 97, segmental rack 102 bar 103, teeth 105 pinion 106 and shaft 107, lever 108, pitman 109, lever 110, shaft 111, lever 112, connecting 113 and valve pin 114 to move the valve pin 114 from rapid traverse forward position 120 to feed forward position 119. This results in the tool being fed into the work at the desired feed rate. This feeding rate is determined by the setting of the eccentricity of the plunger pump in the usual manner through the setting lever 182 which is locked into position by the lock 183. The oil behind the piston 125 returns through the passage 132, pipe 131, manifold chamber 161, port 167, pipe 166 and pipe 168 to the foot valve K entering K through the port 169 whence it returns to the pump sump 375 through the lines 234 and 181.

This operation continues the tool support stop pin head 83 engages the stop 82 on the tool supporting bed. The oil pressure then builds up until in the head of the cylinder 76 at 129 until it reaches 750 pounds per square inch whereupon resistance valve E opens permitting the flow of high pressure fluid from the line 212 through the line 184 through the port 185, the 750 pounds of pressure being sufficient to lift the valve member 186 against the spring 187 which is a 750 pound spring and thereby permit the oil to flow through the passageway 188 and outlet line 189 thereby delivering a shot of oil into the hydraulic cylinder of the control valve C through the port 190. This serves to lift the valve stem in the control valve C, such valve stem being designated 191. The valve stem is provided with an enlarged shoulder portion 192, a narrow throat 193 and another shoulder portion 194 with a guide pin portion 195 at the other end operating in the passageway 196. The result of the pressure on the high pressure side of this valve C through the line 190 is to lift the valve stem 191 so that the port 197 is closed by the shoulder 192 and the port 198 is opened by the shoulder 194 moving away from it so that the narrow throat 193 is opposite the port 199 and the port 198 permitting the low pressure oil from the gear pump 179 to pass through the pipe 200 into the pipe 201 port 198 thence into the port 199 out through the pipe 202, pipe 203 into the port 204 of the valve A thereby moving the valve stem 205. This valve stem 205 has a throat portion 206, a shoulder portion 207, a throat portion 208, a shoulder portion 209, a throat portion 210 and a shoulder portion 211.

The pressure is also admitted to the line 204 but it is stopped by the three-way member 205a when the handle is in the horizontal position, so that the pressure cannot pass through the pipe 206 to the hydraulic shifting valve F which is adapted to shift the valve controlled by the valve stem 114. The function of 205a and its associated mechanism will be hereinafter described.

The effect of the gear pumping oil from the control valve C is to move the valve stem 205 in control valve A so that the high pressure oil from the plunger pump 180 can pass through the control valve A from the pipe 212 through the port 213 around the throat 208 into the port 214 thence through the pipe 145 to the forward end of the cylinder 143 in front of the piston 142 so that the longitudinal movement of the tool support may be executed at feeding speed. When oil is being delivered through pipe 145 oil is returning through pipes 144, 234 and 181 to the valve F. This movement carries the carriage to which the cam roller 99 is connected through the yoke 97. This roller is in engagement with a longitudinal cam 100 which is stationary as it is attached to the bracket 24 to the center section pan. As the carriage feeds towards the left it eventually engages the stop 138 and remains there with the result that the oil pressure through the pipe 145 to the head of the cylinder 143 raises until it reaches 900 pounds per square inch whereupon resistance valve M which is connected into the high pressure line from the plunger pump 180 by the pipe 215 opens by lifting valve member 216 against the resistance of the spring 217 which is a 900 pound spring, allowing the oil to pass through the passageway 218 into the pipe 219 to give a shot of oil into the control valve B lifting the valve stem 220 which has the shoulders 221, throat 222, shoulder 223 and pin 224. This results in allowing the low pressure gear pump oil to pass from pipe 200 to pipe 225 into the port 226 around the throat 222 into the port 227 thence through the pipe 228 to the end of the hydraulic shift valve F to force the pump control valve and its pin 114 from feed forward to rapid traverse reverse position 116. This results in the cam follower 96 engaging the cam 93 on the cross feed cam which has no rise and cam follower 99 engages cam 100 on the stationary cam. The high pressure oil from the pump through 181 and the line 234 passes through valve K lifting the ball 230a above the spring 231 holding the valve 230 and thence passes out through the port 169, pipe 168, pipe 166, pipe 131 to the area 133 behind the piston 125 causing a withdrawal of the tool and tool support from the work. During this operation the oil from area 129 returns through pipes 165 and 212 to the valve F. This also returns the cams 91, 92 and 93. When the tool support arrives against the stop 151, the pressure rises to about 100 pounds per square inch whereupon the foot valve J opens by allowing the pump pressure oil from 181 to enter through the pipe 234 lifting the valve 235, spring 236 and thence pass out through the port 237 into line 238 into the port 239 lifting the ball 240 in the valve H, port 241a, and thence out through the pipe 144 to the back of the cylinder 143 behind the piston 142 to cause the carriage to return to its initial position.

When oil pressure reaches 300 pounds per square inch valve I opens. Oil from line 241 compresses the valve 242, spring 243, port 244, line 245 and closes valve C through lines 245, port 246, and when the oil pressure reaches about 400 pounds per square inch, resistance valve G opens allowing a shot of oil to pass into the hydraulic control valve cylinders A and B. This oil passes from the pipe 241 through the port 247 where it engages the valve member 248 in G, compresses the spring 249 which is a 400 pound spring and delivers the oil through the pipe 250 whence it passes by pipe 251 into control valve B port 252 which causes the valve stem 224 with shoulders 233, 222 and 221 and valve stem 220 to move back to the initial position which serves to release the oil pressure in F. Valve A is closed through line 253, port 254 which causes valve stem 211 to move back to initial position.

The control levers remain in neutral position ready for a re-starting of the cycle. In this position the oil is by-passed through the valve 372 and pipe 373 to the sump 375. This same operation delivers through pipe 251 a shot of oil to the control valve B through the pipe 251, port 252, which serves to restore the valve stem to its initial position as shown in Figure 42, thus allowing the oil pressure in cylinder F to be released.

The foot valve K is to prevent the cylinder 76 from creeping slowly forward when the pump control is in neutral due to gear pressure. The foot valve H is to prevent the piston in cylinder 143 from a forward motion while the cylinder 76 is moving forward. If a rapid traverse forward speed for the cylinder 143 is desired, it may be obtained by turning the three-way cock 205a in such a position as to permit the gear pumping oil from valve C to enter the cylinder F through the lines 202, 204, three-way cock 205a, and pipe 206. This three-way cock is then left in this position. If it is desired to have the cylinder 143 start on a rapid traverse forward and after a certain travel to move forward at a feeding rate, this result can be obtained by leaving the cock 205a in the position described above and by placing the cam 255 on the bracket 24 when the result will be as seen in Figure 19. The dotted line indicates the path of the cam follower 99 when this cam 255 is used. The full line indicates the path of this cam follower when this cam is not used. When the cam is not used the movement of the tool longitudinally of the work is purely a feeding movement at a relatively slow speed. The reason for using the cam 255 is to permit of a very rapid forward movement from one feeding position to another. The legends on Figures 19 and 20 indicate the path of movement of the cam follower rollers 96 and 99 and the operation of the machine according to the position of such rollers on the cams.

*Drain lines*

The drainage system has to be provided for this hydraulic system. This consists of the choke D having the choke coil 256. The choke and drain lines serve not only to drain the surplus oil back into the system and return it but also to hold the drain system from immediately draining the system in order to insure that the shot of oil to the control valves A, B and C will go first to such valves to do the work before the oil can pass through the choke through which it will drain more slowly. Any surplus not used from such operations can then drain away at leisure through the choke lines 245—245a, 245b drain valve C and valve I.

These drain lines consist of the pipes 257 and 258 leading to the air drain 259 so that any air collected in the system may be extracted from the oil. The pump is drained by the drain line 260, the line 261 that communicates with the three-way valve 205a, the line 262 that communicates with the choke D, the line 263 and with pipes 264, 265 and 266, 263 drains valve A. The pipe 267 serves to drain the valve C. The pipe 268 also serves to drain the valve B. Line 250a drains valve G.

*Vertical tool carriage*

In the event that it is desired to utilize a vertical tool carriage which will carry a tool to and from the work in a vertical direction, I provide an independent unitary equipment which may be mounted upon the top of the tail of the head stock housing or may be mounted upon the pump housing or upon a supplementary bracket on either side of the machine, but for the purpose of illustration, I have indicated it as being mounted upon the existing top of the head stock housing.

Figure 24:
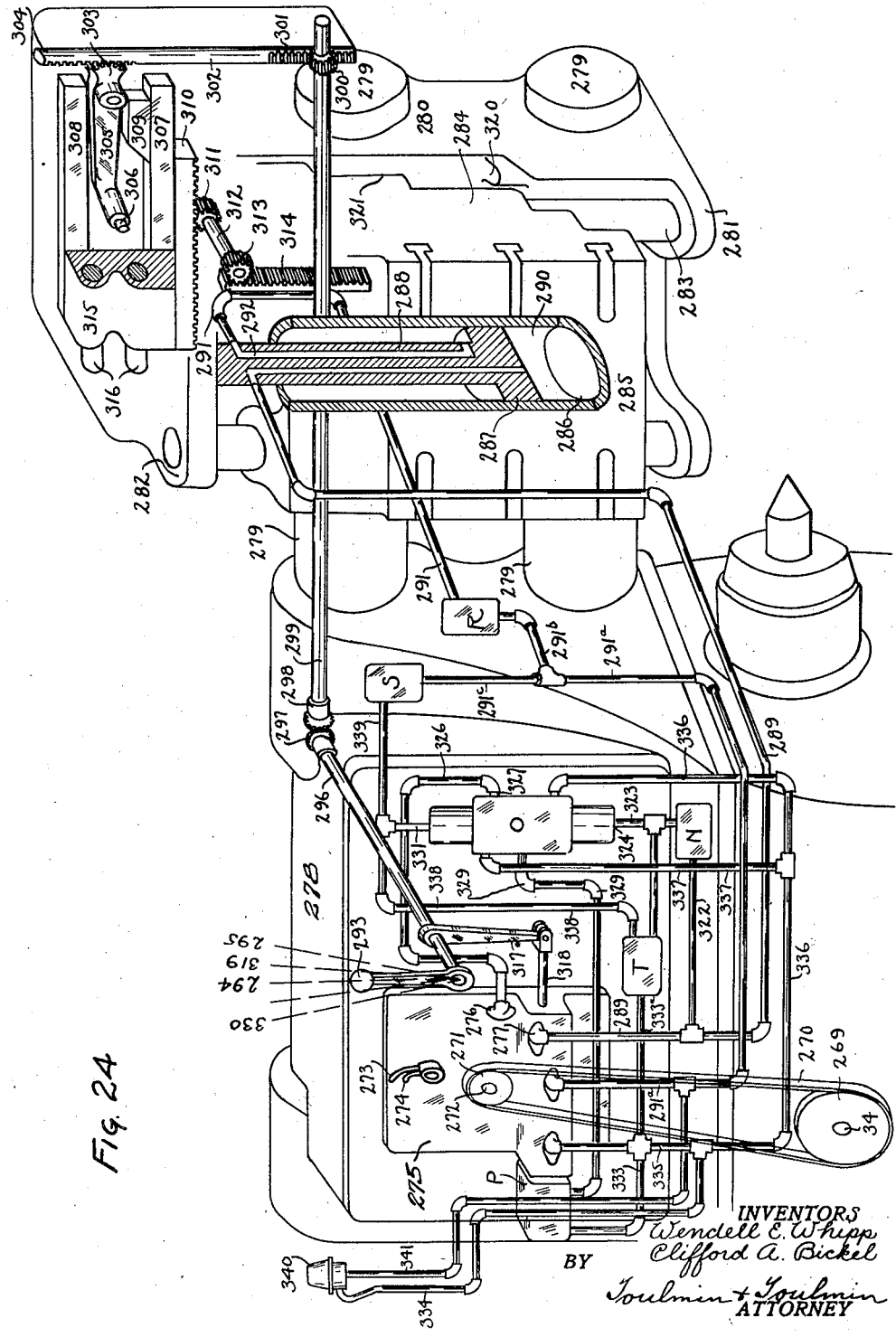
Figure 24 is a similar view as applied to a vertical tool holder.
Figure 32:
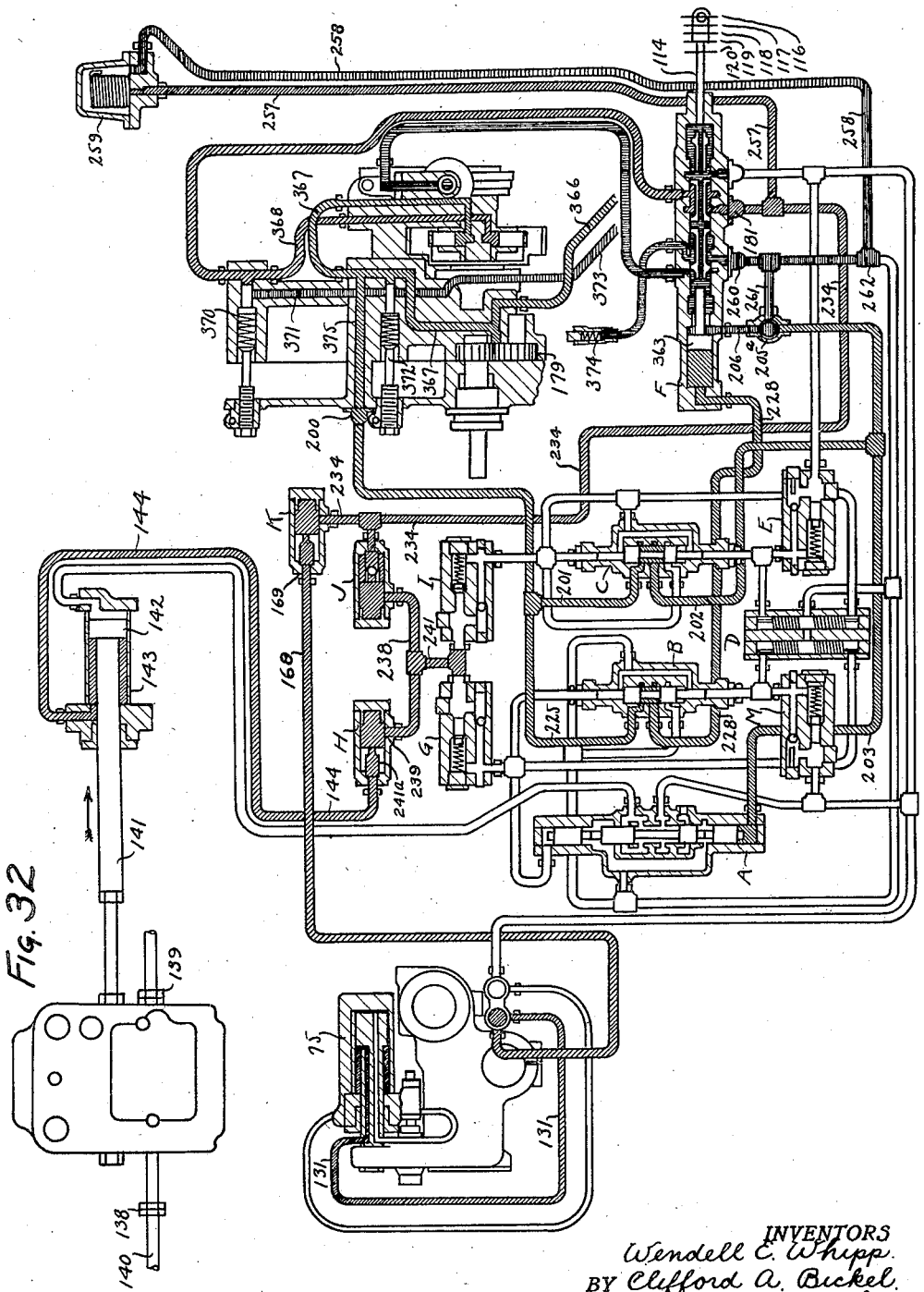
Figure 32 is a similar view of the parts when the tool holder is being returned to its initial position longitudinally of the machine, i. e. carriage traverse reverse.
Figure 56:
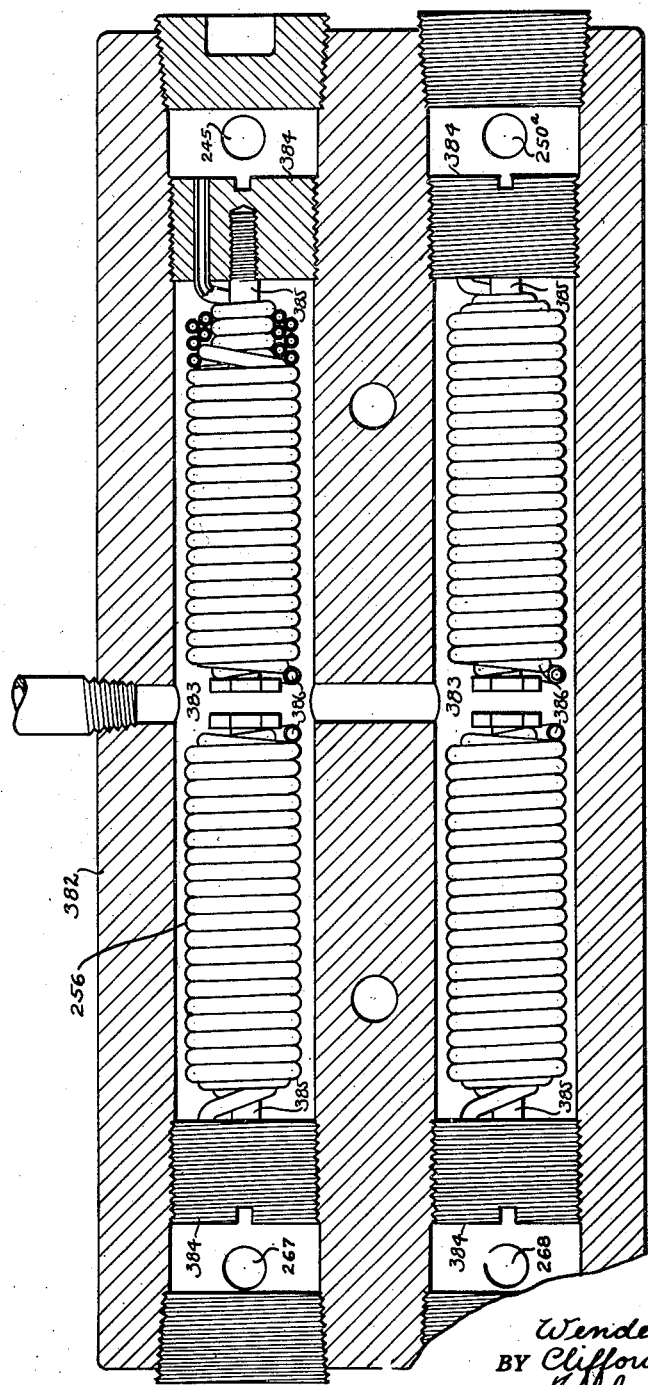
Figure 56 is a section through the choke D.

For this purpose, I have provided for the source of power a sprocket 269 which is mounted on the end of the shaft 34 (see Fig. 24). This sprocket drives a chain 270 that in turn drives a sprocket 271 on the pump shaft 272. This pump is similar to the pump previously described being a combined gear pump for low pressure and plunger pump for high pressure, the lower pressure pump delivering the greater volume of fluid for the system. This pump is provided with the handle 273 for controlling the rate of pumping of the plunger pump with the locking handle 274. The pumps generally are designated 275. The gear pump or low pressure pump is generally designated 276, the high pressure pump is 277. A housing 278 is provided for the hydraulic system which housing is mounted upon the top of the head stock housing. This housing 278 carries a pair of round supports 279 upon which the carriage 280 is adjustably mounted in the same manner as indicated for the other carriages upon other similar tubular or rod supports. This carriage 280 is provided on its upper and lower ends with spaced shoulders or eyes 281 and 282 which carry between them round bars or slides 283 which pass through sleeves 284 that are formed integrally with and as a part of the tool support 285. This tool supporting bed has formed therein a cylinder 286. In the cylinder is mounted a piston 287 carried on a piston rod 288 which is fastened to and is a part of the tool supporting bed 280.

Pressure is delivered through the pipe 289 and the center of the piston rod 288 to the forward end of the cylinder 286 into the area 290. This pressure is from the high pressure side of the pump, delivering the high pressure. Pressure is delivered to the rear side of the piston 287 through the pipe 291 which communicates with the passageway 292 that leads through the stationary piston rod to a point behind the piston 287.

Control mechanism for vertical tool support slide

The handle 293 is in neutral position 294. This handle is then moved to the position indicated at 295 known as the rapid traverse forward position. This results in rotating the shaft 296, the bevel gears 297 and 298, the shaft 299, the pinion 300 which engages with the teeth 301 and the rack bar 302. This in turn actuates the segmental rack 303 which engages with the teeth 304 on the rod 302. The result of the movement of the segment 303 is to move the cam roller support 305 and the cam roller 306. This moves this roller cam 306 against the cam 307. High pressure from the high pressure line 289 enters the end 290 of the cylinder 286 and forces the tool support downwardly on a tool supporting bed 280 with a rapid movement. The cams 308, 309 and 307 are attached to the cross feed slide or tool support which in turn is attached to the cylinder 286 through the rack 310, pinion 311, shaft 312, pinion 313 and rack 314 which is mounted on the tool supporting bed 285. The movement of the tool supporting bed results in the movement of the support 315 on the slide rods 316 for the cams 307, 308 and 309, thus bringing the cam roller 306 against the cam 307 and then against cam 309. The resulting movement of the cam roller 306 is transferred through the segment 303, the rack bar 302, rods 299 and 296 to the arm 317 which is connected to the valve stem 318. The construction of the pump 275 and the valve stem 318 is the same as that previously described and as will be described in detail hereinafter.

However, in order to identify the relationship of the parts in the present arrangement, this pump and associated parts will have its own set of numerals.

The result of this movement is to move the valve stem 318 to the feed forward position 319. Return oil from the cylinder 286 goes back to the pump 275. The cylinder 286 moves forward at a feeding rate as determined by the control lever 273. This continues until the tool support slide engages a stop mechanism, such as the stop 320 by the stop 321.

Upon this event occurring, the oil pressure in the pipe line head of the cylinder 286 will rise until it reaches 800 pounds per square inch whereupon resistance valve N will open the communication between line 289, 322, resistance valve N and the line 323 to the control valve O at port 324. The valve plunger generally designated 325 then moves with the result that oil from the gear pump 276 is allowed to pass through the line 326 into port 327 to port 328, line 329 to hydraulic shifting valve P. This results in shifting the valve 318 to rapid traverse position 330. The cam roller 306 remains in this position until it strikes cam 308. Then, high pressure enters the piston 288 from lines 291a and 291b and foot valve R and line 291 and 292. This returns the tool support across slide back to starting position. Just before this tool slide engages with a rear stop not shown, cam roller 306 has been elevated by the cam 309 throwing the pump and control to feed reverse, thus holding the carriage against the stop with pressure. When the pressure reaches 750 pounds per square inch resistance valve S opens permitting a shot of oil to pass into the upper end of the control cylinder O through the line 331 and port 332 moving the valve stem 325 back to its initial position.

This high pressure oil is supplied through the lines 291a and 291c. This releases the oil pressure in the cylinder P. The pump remains at reverse feed position. The cycle can now be repeated.

The foot valve R is used to prevent the cylinder 286 from crawling slowly forward when the pump control is in neutral to move the gear pump pressure. The lines 333, 334, 335, 336, 337, 338 and 339 are drain lines. T is a choke which has the usual choke coil in it, hereinafter described. 340 is an air drain elsewhere described, fluid being delivered to it through the pipe 341 and removed through the pipe 334. The resistance valve S is provided with a valve member 342 which works against a spring of 750 pounds marked 343. Oil on its return passage can pass through the passageway 344 merely lifting the ball 345.

As to foot valve R, the high pressure oil entering the pipe 291b passes through valve member 346, spring 347 of 150 pounds, and thence out through the pipe 291. On the return, the oil can drain through the port 348 compressing the ball 349 and holds back pressure on piston 287.

The resistance valve N is arranged for the high pressure oil to enter through the pipe 322 lifting the valve member 350 against the 800 pound spring 351 and thence out the pipe 323. The return oil can drain through the passageway 352 lifting the ball 353. The stud 354 acts as a limiting member for the ball.

Pump mechanism

The pump mechanism is the same for each of the installations whether for horizontal tool supports and tool supporting beds or vertical.

For instance, the valve stem 114 operates valve member having a shoulder 355, a throat portion 356, a shoulder 357, a throat 358, a shoulder 359, a throat 360, a shoulder 361, a throat 362, and a piston 363.

This valve stem and its accompanying parts operate in a transverse tubular passageway 364 in the pump housing. The pump housing contains an oil reservoir or sump 375 from which oil is pumped through the pipe 366 by the gear pump 179. High pressure oil is supplied to pipes 212, 181. The high pressure line is provided with a relief valve 370 which is a return line, to the sump 375 which is designated 371. 372 is a relief valve for the low pressure line. It drains back in through the line 373 to the sump 375. A relief valve 374 is utilized for neutralizing pressures. 375a is an outlet line for the gear pump 179. It in turn communicates with the outlet pipe 200.

In Figure 25 the valve stem 114 is shown in neutral position, with the high pressure oil being by-passed into the sump. When the machine is started the stem 114 is shifted to the position 120, thus closing off the by-passing of the oil to the sump, whereby the oil, under pressure, goes through line 212 for supplying pressure to the area 129. At the same time oil is being returned gradually from the area 133 back to the valve F, through the pipes 234 and 181. During this operation the cylinder is moved forwardly at a differential advance or rapid transverse forward movement. As the feed cam throws the pump into a feeding cycle the valve 115 is shifted to position 119, closing off pipe 181 and allowing the high pressure fluid to flow through pipe 212. The returning oil is conducted through pipe 181 to the sump through the relief valve 374.

When the carriage comes again against its forward stop and the valve B permits the gear pump pressure to move the piston 363 of the control valve F by pressure through line 228 to shift the stem 114 to a rapid transverse position 116, thus closing off pipe 212, the high pressure oil enters the area of the cylinder 133 through the pipes 181 and 131, returning the carriage to the starting position. As the carriage strikes the positive stop the return cam shifts the valve stem 114 to either reverse feed position 117 or to neutral position 118, as desired. If held in feed reverse position this will hold the carriage stop against the stop with pressure.

The mechanism for changing the eccentricity of the high pressure pump consists of the handle mounted on the shaft 376 which actuates the arm 377 and the strap 378 which moves the eccentric 379 and holds it in the desired position for controlling the throw of the pistons in the high pressure pump 180. Such pistons are designated 380 and work within the cylinders 381.

Drain and choke coils

The chokes such as coke D consist of a housing 382 through which are arranged passageways 383 filled at either end by plugs 384 which carry standards 385 for supporting coils of hollow tubing 386, one end of which is projected through the plug 384 and opens in the end of the passageway 383, the other end of which discharges on the interior of the passageway 383 behind the block 384. The hydraulic medium must pass through this restricted coil which acts as a brake or choke.

Air drain

The air drain 259 consists of a base 387 with a detachable cover 388. The oil enters the port 389 and thence is delivered into the coil 390 which discharges at the point 391 to provide an air gap 392 for the escape of the air from the oil which drips down into the receiving passageway 393.

Control valve A

This valve controls the forward longitudinal movement of the carriage. It controls the passage of high pressure oil from the pump to the longitudinal carriage cylinder 143 by means of low pressure oil through the control cylinder C and thence into the control valve A.

Control valve B

Control valve B is for the purpose of controlling the withdrawing transverse feed and controlling the withdrawing of the longitudinal movement. It controls the application of oil pressure from the pump through the resistance valve M to the hydraulic shifting valve mechanism F to move the valve from feeding forward to rapid traverse reverse position in connection with the cylinder 76 of the tool support.

Control valve C

This valve controls the oil passing from the pump to control valve A. It is desirable to hold the tool against the work until the predetermined reverse pressure is built up. Hence, the high pressure pump will build up the pressure, (this pump is capable of building up 1085 pounds) until the pressure is sufficient (750 pounds) to open the resistance valve E which allows the oil pressure to shift the valve in control valve C; this results in the low pressure (about 85 pounds) passing to control valve A to shift it. This shifting puts the high pressure line in communication through the control valve A with the longitudinal cylinder 143 to move the carriage longitudinally.

Choke D

This choke prevents the oil which is admitted through one of the resistance valves to move one of the control valves from passing directly to the drain.

The high pressure oil will pass from the resistance valve to move one of the control valves more easily than it can pass through the choke but any surplus of oil left over after this movement by it is slowly drained into the choke into the drain system.

Resistance valve E

This resistance valve opens at 750 pounds when such a pressure has been accumulated by reason of the high pressure delivered from the high pressure pump to cylinder 76. Upon the opening of the resistance valve E, the high pressure oil enters the control valve C moving its valve and permitting the low pressure oil from the gear pump 179 to move the valve in the control valve A so that the high pressure in line 212 from the high pressure pump 180 can pass into the cylinder 143 to move the carriage longitudinally.

Hydraulic valve shift F

This hydraulic valve shift is for the purpose of hydraulically moving the control valve 114 after it has been set by the control lever 170 at one stage of the operation. Control valve F itself is restored to its initial position or neutral position by the resistance valve G hereinafter explained.

Resistance valve G

This valve restores hydraulic control valve F to neutral position. It does this by controlling the oil flow from the control valve A to the control valve B which relieves the oil pressure in the hydraulic valve F.

Foot valve H

The purpose of the foot valve H is to allow pressure to be put on the rear side of the piston of the carriage cylinder to prevent the piston from moving forward while the tool slide piston and cylinder are in relative movement in the forward position.

Resistance valve I

This resistance valve controls the passage of oil to control valve C to restore the valve in C to its initial position.

Foot valve J

This valve controls the oil pressure into the front end of the cylinder 142 to maintain it inoperative while the cross feed tool support is being returned from the work before the carriage is returned by the cylinder 143 and piston 142 to its initial position.

Foot valve K

This valve prevents the tool support from gripping forward when the pump control is in neutral position.

Air drain

The purpose of this air drain is to extract air which may be entrapped in the oil so as to prevent the system from becoming air bound.

Resistance valve M

This valve provides means to bring about a return movement of the tool slide and carriage.

Resistance valve N

This valve opens at 800 pounds pressure per square inch in order to permit a shot of high pressure oil to enter the control valve O to shift the control valve so that low pressure gear pump oil will pass to the hydraulic valve P for shifting the valve 318 that controls the application of high pressure low pressure oil.

Control valve O

This valve controls the application of low pressure oil to the hydraulic valve shifting mechanism P for shifting the valve 318.

Hydraulic valve P

This valve shifts the valve 318 for controlling the application of high and low pressures. The application of low pressure oil to this valve results in moving 318 to the right thereby moving the control valve 318 from feed forward to rapid traverse reverse position.

Foot valve R

This valve now lifts under the high pressure and the cross slide returns back to starting position. This foot valve prevents the cylinder on the tool slide from creeping slowly forward when the pump control is in neutral which it would otherwise do due to the gear pump pressure.

Resistance valve S

When the pressure on the return side of the cylinder, due to the high pressure delivery of oil reaches 750 pounds per square inch, the resistance valve S opens admitting a shot of high pressure oil into the control valve O thereby releasing the oil pressure in the hydraulic valve P so that the pump valve 318 remains at reverse feed position.

Choke T

This is a choke coil connected into the drain lines for the purpose already described in connection with the other choke.

Air drain 340 is an air drain for eliminating air from the oil circuit to prevent the hydraulic system from becoming air bound.

Operation diagrams

The conditions of pressure in various parts of the hydraulic system at different stages of the operation are indicated by the cross hatching in the lines involved as indicated on Figures 28 to 33 inclusive. The diagonal hatching running to the lower right direction indicates high pressure; diagonal lines running to the lower left indicates low pressure; the vertical lines indicate 400 pounds back pressure from both pumps; and the horizontal lines indicate the drains.

Adjustment mechanism for slides and tie bars

This adjustment mechanism is adjusted by loosening the screw bolts 9 and rotating the bushings which are bored eccentrically one-sixty fourth of an inch. Thus any variations in the manufacture of the assembly parts may be accommodated and an exact alignment obtained.

It will be understood that we desire to comprehend within our invention such modifications within the scope of the claims as may be necessary to adapt it to varying conditions and uses.

Having thus fully described our invention, what we claim as new and desire to secure by Letters Patent, is:—

1. In a lathe, a head stock section, a pan section, a pump housing section and bar means for retaining said sections together as a unit, said bars consisting of cylindrical members means for retaining said members at either end in the head stock section and the pump housing section, a tail stock mounted on said interconnecting members, and means to align vertically the pan section with respect to the sections at either end thereof.

2. In a lathe, a head stock section, a pan section and a motor housing section, said pan section serving to align and space the stock section and the motor housing section, bar members for interconnecting said head stock and motor housing sections so arranged as to provide for such sections clamping the pan section therebetween.

3. In a lathe, a head stock section, a pan section and a motor housing section, said pan section serving to align and space the stock section and the motor housing section, bar members for interconnecting said head stock and motor housing sections so arranged as to provide for such sections clamping the pan section therebetween, and means for aligning said pan section with the other sections at either end thereof.

4. In a lathe, a head stock section, a pan section and a motor housing section, bar members for interconnecting said head stock and motor housing sections so arranged as to provide for such sections clamping the pan section therebetween, means for aligning said pan section with the other sections at either end thereof, said aligning means consisting of a transverse member mounted in recesses in the faces of the pan section adjacent the faces of the tail stock and pump housing sections.

5. In a lathe, end sections, a center oil and drain pan section and bar members interconnecting said end sections, a tail stock mounted upon said bar interconnecting members so as to be originally aligned with a head stock in the opposite end section and a head stock therein.

6. In a lathe, a head stock housing comprising a motor enclosure, a head stock and a head stock support adapted to be driven from said motor all enclosed within said housing, a pan section, a motor housing section adapted to enclose pumps and hydraulic mechanism for operating tool equipment for the lathe and bar members adapted to interconnect said sections, and a tail stock mounted on said bar members in alignment with the head stock.

7. In a lathe, a head stock housing comprising a motor enclosure, a head stock and a head stock support adapted to be driven from said motor all enclosed within said housing, a pan section, a motor housing section adapted to enclose pumps and hydraulic mechanism for operating tool equipment for the lathe and bar members adapted to interconnect said sections, a tail stock mounted on said bar members comprising in alignment with the head stock, slidable bar members mounted in said tail stock section and motor housing section for slidably supporting tool carriages and traveling therewith.

8. In a lathe, a head stock housing comprising a motor enclosure, a head stock and a head stock support adapted to be driven from said motor all enclosed within said housing, a pan section, a motor housing section adapted to enclose pumps and hydraulic mechanism for operating tool equipment for the lathe and bar members adapted to interconnect said sections, a tail stock mounted on said bar members mounted in said tail stock section in alignment with the head stock, slidable bar members mounted in said tail stock section and motor housing section for slidably supporting tool carriages and traveling therewith, said tool carriages being also arranged for slidable movement upon the first mentioned interconnecting bars.

9. In a lathe, end sections, a pan section, round bars of relatively large diameter interconnecting said sections and rigidly attached thereto, other round bars slidably mounted in said sections, and tool carriages mounted on said bars so arranged as to move with the slidable bars and to slide upon the stationary bars.

10. In a lathe, end sections, a pan section, round bars of relatively large diameter interconnecting said sections and rigidly attached thereto, other round bars slidably mounted in said sections, tool carriages mounted on said bars so arranged as to move with the slidable bars and to slide upon the stationary bars, a head stock in one of said sections and a tail stock mounted on the stationary bars in alignment therewith.

11. In a lathe, end sections, a pan section, round bars of relatively large diameter interconnecting said sections and rigidly attached thereto, other round bars slidably mounted in said sections, tool carriages mounted on said bars so arranged as to move with the slidable bars and to slide upon the stationary bars, a head stock in one of said sections and a tail stock mounted on the stationary bars in alignment therewith, and a lubricant reservoir in the pan section for delivering lubricant to the tools of the lathe.

12. In combination in a lathe of a head stock section, including a head stock and a motor housing, a tail stock section, means to connect space and said sections including a pan, means to support a tool carriage between said sections, a tool carriage supported thereby, a tool support on said tool carriage, and means for imparting longitudinal movement to said carriage and transverse movement to said tool support.

13. In combination in a lathe of a head stock section, including a head stock and a motor housing, a tail stock section, means to connect and space said sections including a pan section, means to support a tool carriage between said section, a tool carriage supported thereby, a tool support on said tool carriage, means for imparting longitudinal movement to said carriage and transverse movement to said tool support, hydraulic means for moving said carriage longitudinally and said tool slide transversely.

14. In combination in a lathe of a head stock section, including a head stock and a motor housing, a tail stock section, means to connect and space said sections including a pan section, means to support a tool carriage between said sections, a tool carriage supported thereby, a tool support on said tool carriage, means for imparting longitudinal movement to said carriage and transverse movement to said tool support, hydraulic means for moving said carriage longitudinally and said tool slide transversely, mechanical means for setting into operating condition said hydraulic means.

15. In combination in a lathe of a head stock section, including a head stock and a motor housing, a tail stock section, means to connect and space said sections, including a pan section, means to support a tool carriage between said sections, a tool carriage supported thereby, a tool support on said tool carriage, means for imparting longitudinal movement to said carriage and transverse movement to said tool support, hydraulic means for moving said carriage longitudinally and said tool slide transversely, said hydraulic means being so arranged that upon the accomplishment of a series of predetermined pressures and upon the accomplishment of the successive tool slide transverse movement, forward longitudinal movement, withdrawal of transverse movement and withdrawal of longitudinal movement the hydraulic mechanism will be automatically reset and launched upon its new cycle for operation of the next movement.

16. In combination in a lathe of a head stock section, including a head stock and a motor housing, a tail stock section, means to connect and space said sections including a pan section, means to support a tool carriage supported thereby, a tool carriage between said sections, a tool support on said tool carriage, means for imparting longitudinal movement to said carriage and transverse movement to said tool support, hydraulic means for moving said carriage longitudinally and said tool slide transversely, said hydraulic means being so arranged that upon the accomplishment of a series of predetermined pressures and upon the accomplishment of a series of successive tool slide transverse movement, forward longitudinal movement, withdrawal of transverse movement and withdrawal of longitudinal movement the hydraulic mechanism will be automatically reset and launched upon its new cycle for operation of the next movement, mechanical means adapted to restore the hydraulic movements and means for restoring said mechanical means to its initial starting position at the end of the cycle of movements.

17. In a lathe, a head stock section, a tail stock section, means for interconnecting said sections, tool carriages slidably supported on said interconnecting means adapted to longitudinally and transversely move, a third tool carriage adapted for vertical movement, said last mentioned tool carriage being adapted to be mounted on the head stock section, and a series of independent pumps, hydraulic systems operated by said pumps, cams and interconnected mechanical operating means for operating the hydraulic systems to move the carriages and tools in a sequence of operations designed to move the tools to the work, to feed into the work, to move them longitudinally of the work and to return them to their initial position after the completion of the work.

18. In a lathe, a head stock section, a tail stock section, a motor for the head stock section, means for interconnecting said sections, tool carriages slidably supported on said interconnecting means adapted to longitudinally and transversely move, a third tool carriage adapted for vertical movement, said last mentioned tool carriage being mounted on the head stock section, and a series of independent pumps, hydraulic systems operated by said pumps, cams and interconnected mechanical operating means for operating the hydraulic systems to move the carriages and tools in a sequence of operations designed to move the tools to the work, to feed them into the work, to move them longitudinally of the work and to return them to their initial position after the completion of the work, a common motor means for driving the pumps for the horizontal tools and tool carriages and means for driving the vertical tool carriage from the motor driving means for the head stock and work.

19. In a lathe having a longitudinally moving tool carriage and a transversely moving tool slide support, a hydraulic cylinder for moving the carriage longitudinally, a hydraulic cylinder for moving the tool slide transversely, cam means movable with the carriage, stationary cam means adjacent to which the carriage moves when moving longitudinally, means of supplying hydraulic pressure to such cylinders, a valve means for controlling the application of pressure from said hydraulic means, mechanical means for setting said hydraulic valve control, hydraulic means for setting said hydraulic valve control, interconnected means operated by said cams adapted to operate said mechanical setting means, and means for positioning longitudinally on the carriage the cam carried thereby according to the position transversely of the tool slide.

20. In a lathe having a longitudinally moving tool carriage and a transversely moving tool slide support, a hydraulic cylinder for moving the carriage longitudinally, a hydraulic cylinder for moving the tool slide transversely, cam means movable with the carriage, stationary cam means adjacent to which the carriage moves when moving longitudinally, means of supplying hydraulic pressure to such cylinders, a valve means for controlling the application of pressure from said hydraulic means, mechanical means for setting said hydraulic valve control, hydraulic means for setting said hydraulic valve control, interconnected means operated by said cams adapted to operate said mechanical setting means, and means for positioning longitudinally on the carriage the cam carried thereby according to the position transversely of the tool slide, and a hydraulic distribution manifold for distributing hydraulic pressure to and from the tool slide irrespective of the position of the carriage.

21. In a lathe having a longitudinally moving tool carriage and a transversely moving tool slide support, a hydraulic cylinder for moving the carriage longitudinally, a hydraulic cylinder for moving the tool slide transversely, cam means movable with the carriage, stationary cam means adjacent to which the carriage moves when moving longitudinally, means of supplying hydraulic pressure to such cylinders, a valve means for controlling the application of pressure from said hydraulic means, mechanical means for setting said hydraulic valve control, interconnected means operated by said cams adapted to operate said mechanical setting means, means for positioning longitudinally on the carriage the cam carried thereby according to the position transversely of the tool slide, and a hydraulic distribution manifold for distributing hydraulic pressure to and from the tool slide irrespective of the position of the carriage, and means to adjustably position the relative maximum movements between the tool slide and the carriage.

22. In a lathe, a carriage, a tool slide, head and tail stocks supporting the work, means for rotating the work, a source of hydraulic pressure, hydraulic cylinders for moving the carriage and the tool slide respectively, means for distributing hydraulic pressure to the tool slide irrespective of the position of the carriage, valve means for controlling the application of hydraulic pressure from the hydraulic pressure means, means for hydraulically controlling said valve, means for mechanically controlling said valve means for manually positioning said mechanical means, cam means for positioning said mechanical means comprising a movable cam on the carriage adjustably positioned by the movement of the tool slide and a stationary cam adjacent the tool slide along the path of its movement longitudinally and interconnected means engaging both of said cams and also connected to the mechanically operated hydraulic valve, operating means, a high pressure pump in the hydraulic means, a low pressure pump in the hydraulic means and a series of control resistance and foot valves adapted to operate whereby high pressure from the high pressure pump is utilized for moving the tool slide and tool carriage and the low pressure pump is utilized for setting said hydraulic control valves that determine the application of the high pressure hydraulic pressure and said resistance valves being so arranged as to admit the low pressure oil to operate said control valves for admitting the high pressure oil when the back pressure on the respective cylinders for the tool slide and tool carriage accomplish predetermined pressures.

23. In a system of moving a tool for a lathe, a source of hydraulic pressure consisting of high pressure and low pressure, a valve for controlling the alternate application of such pressures, means for mechanically setting said valve, a high pressure hydraulic cylinder for moving the tool carriage longitudinally, a high pressure cylinder for moving the tool slide transversely, a plurality of control valves for admitting the hydraulic high pressure to said cylinders, a plurality of resistance valves adapted to open upon the accomplishment of a predetermined back pressure in the respective cylinders and to admit a shot of oil for moving the control valves thereby opening the low pressure oil in communication with the hydraulic means for shifting the hydraulic valve.

24. In a lathe, a hydraulic system for moving the tool to the work, into the work, along the work, from the work and back into initial position comprising a source of low pressure oil, a source of high pressure oil, a valve for controlling the application of such pressures, mechanical means for operating said valve, hydraulic means for operating said valve, a tool carriage and a hydraulic cylinder for imparting a longitudinal movement thereto, a tool slide and a hydraulic cylinder for imparting a transverse movement thereto, means to limit the relative movement thereof, means to limit the movement of the carriage, a control valve for controlling the longitudinal movement of the carriage, a control valve for controlling the transverse feed withdrawal and the longitudinal withdrawal movement, a control valve for controlling the delivery of pressure to the first mentioned valve for holding the tool against the work until a predetermined pressure is built up in the tool slide cylinder, a resistance valve which opens upon the accomplishment of that predetermined pressure and a resistance valve adapted to operate when the pressure accomplishes a predetermined amount at the end of the longitudinal carriage movement so that hydraulic pressure is admitted to the hydraulic means for controlling the pump setting valve to accomplish a rapid traverse movement.

25. In a system of control for the carriage and tool slide of a lathe, a carriage, a hydraulic cylinder for moving it longitudinally, a tool slide, a hydraulic cylinder for moving the tool slide transversely, a source of hydraulic high pressure, a source of hydraulic low pressure, a reservoir for said hydraulic medium, a valve for controlling the application of said pressures, mechanical means for setting said valve, hydraulic means for setting said valve, a control valve for controlling the forward longitudinal movement of the carriage, a second control valve for controlling the withdrawing transverse feed and withdrawing longitudinal movement, a third control valve for controlling the holding of the tool on the tool slide against the work until the predetermined pressure is built up, a resistance valve adapted to open upon the accomplishment of that predetermined pressure.

26. In a hydraulic system of the character described having a hydraulic cylinder for moving a tool carriage longitudinally and a hydraulic cylinder for moving a tool slide transversely, a source of high hydraulic pressure, a source of low hydraulic pressure, a valve for controlling said pressures, hydraulic means for moving said valves, a control valve for controlling the forward longitudinal movement of the carriage, a control valve for controlling the movement from feed forward to rapid traverse reverse of the tool slide, a control valve for holding the tool against the work until a predetermined pressure is built up, a resistance valve adapted to open upon the accomplishment of the predetermined pressure for operating the last mentioned control valve whereby low pressure is admitted to the first mentioned control valve to move it as a result of which high pressure passes through the first mentioned control valve to move the carriage longitudinally, a hydraulic means adapted to restore the hydraulic control for the valve controlling the high and low pressures to restore it to neutral, a foot valve to prevent longitudinal movement of the carriage while the forward movement of the tool slide is taking place, and a resistance valve adapted to restore the third mentioned control valve to its initial position at the end of the cycle upon the accomplishment of a predetermined pressure, a foot valve adapted to control the pressure on the return side of the hydraulic cylinder until the return of the tool slide is accomplished, and a foot valve for preventing the tool slide cylinder from creeping forward when the system is neutral, a resistance valve adapted to operate when the longitudinal forward movement of the carriage terminates against a stop and a predetermined pressure is accomplished thereby, a choke and a drain system and an air drain for eliminating air from the system.

27. In a lathe having a work support, a carriage, a hydraulic cylinder for moving said carriage longitudinally, a tool support mounted on the carriage, a hydraulic cylinder for moving the tool support, a movable cam, mechanism adapted to be moved on the carriage by the tool support, a stationary cam mechanism adjacent the carriage, cam followers interconnected and engaging the two systems of cams, a mechanical control system operated by said cam followers and cams, two sources of hydraulic pressure, one low and the other high, a valve for controlling the application of said pressures operable by said mechanical control system, a hydraulic valve for operating said valve controlling the pressure, said parts being so arranged that the mechanical setting system can be manually set for moving hydraulically the tool slide transversely with a rapid forward movement until the tool reaches the work, then the movable cam system will set the hydraulic system to forward feeding of the tool support of the tool into the work, then upon the accomplishment of the tool movement to its maximum depth the back pressure in the tool support hydraulic cylinder will shift the pressure for moving the carriage longitudinally to the end of its stroke whereupon the back pressure in the longitudinal cylinder will convert the pressure for returning the tool support to its initial position whereupon the back pressure in the tool supporting cylinder will convert the pressure for returning the carriage to its initial longitudinal position, and mechanical means operable from the stationary cam system for converting the hydraulic system to reverse feed position for maintaining the carriage in its initial position under pressure.

28. In a lathe, a tool carriage comprising a tool supporting bed and a tool support slidably mounted thereon, said carriage being adapted to move longitudinally and the tool support transversely, hydraulic cylinders for the respective carriage and tool support, a source of high hydraulic pressure, a source of low hydraulic pressure, a valve for controlling the application of such pressures, a hydraulic valve for setting said last mentioned valve, and manual mechanical means for initially setting said valves for controlling the application of pressures constituting mechanical means for arranging said valve for traverse rapid forward cross feed movement of the tool support and its cylinder, mechanical means for resetting the hydraulic system for slow feed forward cross movement of the tool support, hydraulic means for converting the hydraulic pressure to the carriage cylinder for longitudinal carriage feeding movement at feeding speed, hydraulic means at the end of the carriage movement for directing the hydraulic pressure to return the tool support to its initial position, hydraulic means for converting the hydraulic pressure to the return end of the carriage cylinder for returning it to its initial position, and mechanical means interconnected with the mechanical control system for shifting the hydraulic system to reverse feed position to hold the carriage in its initial position under pressure.

29. In a hydraulic and mechanical system for controlling the longitudinal position of a carriage and the transverse position of a tool support mounted thereon, a source of hydraulic high pressure, a source of hydraulic low pressure, a valve for controlling said pressures, hydraulic means for shifting said valve, mechanical means for shifting said valve to place it in traverse rapid forward transverse position, cam means operable at a predetermined point in the traverse forward rapid transverse position for resetting the system to feed forward transverse position, hydraulic back pressure means for resetting the system to longitudinal feed position at the end of the feed forward transverse position, hydraulic means for converting the system to return rapid traverse transverse position, hydraulic means for converting the system to traverse return longitudinal position, and mechanical means for converting the system to traverse return longitudinal position.

30. In a lathe, a hydraulic system comprising a high pressure pump, a low pressure pump, a valve for controlling the application of said pressures, a reservoir of hydraulic medium for said pumps, a hydraulic mechanism for shifting the valve controlling said pressures, three control valves, a choke valve, four resistance valves, three foot valves and an air drain, a longitudinal cylinder, a transverse cylinder, a movable cam system moving with the transverse cylinder, a stationary cam system, interconnected cam followers engaging said systems, mechanical means for operating the valve controlling the high and low pressures connected to the cam systems, whereby upon the mechanical setting of the valve controlling the pressures the high pressure moves the transverse cylinder in traverse rapid forward movement until the movable cam system converts it to feed forward movement at the end of the movement the back pressure in the transverse cylinder, converts hydraulically through one of the resistance valves the high pressure to the longitudinal cylinder for longitudinally feeding movement, said high pressure on the back pressure opening one of the control valves for the passage of the low pressure to another control valve whereby high pressure is admitted to the longitudinal cylinder; and upon the longitudinal cylinder reaching the end of its stroke the back pressure opens the third control valve through the resistance valve for admitting high pressure to move the hydraulic means for controlling the valve controlling the high and low pressure thereby admitting high pressure to the rear end of the transverse cylinder; and upon the accomplishment of the back pressure in the rear end of the transverse cylinder the resistance valve the high pressure oil is admitted in the rear end of the longitudinal cylinder for return movement of the mechanical stationary cam system at the end of the movement shifts the valve controlling the high pressure and the low pressure to reverse feed position to hold the longitudinal cylinder in its initial position under pressure.

31. In a lathe having a hydraulic and mechanical system for advancing the tool to the work, into the work, along the work and to return position, mechanical means for setting the hydraulic system to traverse rapid forward transverse position, mechanical means for resetting the system to transverse feed to forward position, hydraulic means for converting the system to longitudinal feeding position, hydraulic means for converting the system to reverse transverse position, hydraulic means for converting the system to reverse longitudinal position, mechanical means for converting the system to reverse feed position and means to drain the system and means to eliminate air from the system.

32. In a lathe having a combined mechanical and hydraulic system for automatically moving the tool carriage longitudinally along the work and a tool support rapidly to the work and into the work, mechanical means for setting the hydraulic system for rapid traverse forward transverse movement, mechanical means operable at the end of said rapid transverse forward movement for converting the hydraulic system to feed forward transverse movement, hydraulic means for converting the system hydraulically from a feed forward transverse movement to longitudinally rapid traverse forward movement, hydraulic means for further converting the system to rapid transverse reverse position, hydraulic means for converting the system to rapid return longitudinal position, and mechanical means for converting the system to reverse feed position.

33. In a lathe, a head stock, a tail stock, means for revolving the work carried to the stocks, vertically disposed stationary carriage, a vertically disposed tool support slidably mounted to and from the work on said carriage, a cylinder in said support, a piston on said carriage, a movable cam system mounted on said carriage moved by the tool support, interconnected manual setting means connected to a cam follower engaging the cam system, a cam follower, a source of hydraulic low pressure, a source of hydraulic high pressure, a valve for controlling the application of said pressures interconnected with the mechanical setting means, hydraulic means for shifting said valve, a control valve, a foot valve, two resistance valves and a choke so arranged that upon the setting of the mechanical control system high pressure will be delivered to the cylinder to move the tool in rapid movement through the work, then the cam system will convert the hydraulic system to feeding position of the tool into the work and upon the accomplishment of a predetermined pressure the back pressure in the cylinder will hydraulically convert the system into rapid return position whereupon the system will be held yieldingly in its return position.

34. In combination in a lathe of a stop adjusting system between the carriage and the tool supporting slide, a carriage, a tool supporting slide having a depending threaded ear, a threaded adjusting stop carried thereby, means for locking said threaded stop in adjustable positions in said ear and an adjustable stop mounted on said threaded stop for limiting the rear movement of the tool slide with respect to the carriage, a micrometer movement connected to said threaded stop which is adapted to move slidably longitudinally thereof for adjusting the position of the threaded stop in the ear and a stationary stop at the other end of the threaded stop, such stationary stop being mounted on the tool carriage.

35. In combination in a lathe, a tool carriage, a tool support slidably mounted thereon, an adjustable stop carried thereby, means on the tool carriage for adjusting the position of said stop in the tool slide, a stationary stop on the carriage for engaging the adjustable stop, means for locking the adjustable stop in adjusted position on the tool slide and a rear limiting stop on the adjustable stop for determining the maximum rear movement of the tool slide on the carriage.

36. In a lathe, a carriage, a tool slide, a threaded adjustable stop carried in the slide, said stop having a groove in one face thereof, the portion having the groove being inserted within the sleeve in the tool carriage, a sleeve and means for rotating said sleeve mounted in and on said carriage, a pin depending from said sleeve into said slot and means for locking the adjustable means in position, and means mounted on the adjustable stop for limiting the rear movement of it and the tool slide with respect to the carriage and means on the carriage for limiting the forward movement of the tool slide by engaging with the forward end of the adjustable stop.

37. In a lathe, a manual control system for controlling the hydraulic system for moving the carriage and tool support comprising in combination a setting handle, a segmental rack, a rack rod, a pinion operable thereby, a shaft operable by the pinion and a hydraulic control valve operable from the shaft, a system of movable cams, a system of stationary cams, interconnected cam followers, means for supporting the movable cams and for moving the interconnected followers, and means interconnecting the cam followers and means for setting the valve, and means for moving the movable set of cams interconnected with the tool support to be adjusted by its movement upon the carriage, and said movable system of cams comprising spaced parallel cam surfaces and a single high spot on one of the parallel surfaces and a stationary cam system consisting of a single horizontal cam surface with a single high spot, and a spaced oppositely disposed cam at the other end of the cam system away from the high spot of the first mentioned cam.

38. In a lathe, a head stock, means for driving said stock, a tail stock, a pan section, a housing for the head stock and a motor housing, means for interconnecting said housings with the pan in between oppositely disposed tool supporting carriages mounted on said interconnecting means, each of said carriages having interconnected mechanical control means for controlling said carriages, a common motor means in the motor housing and independent hydraulic systems driven thereby oppositely disposed within said housing for cooperating with their respective mechanical systems for controlling the carriages.

39. In a lathe, a tool carriage having spaced shoulders, round bars interconnecting said shoulders and a tool slide adapted to slide on said bars, bearing sleeves on said bars carried by the tool slide, said sleeves being externally tapered and means for adjusting said sleeves and tool slide for wear.

40. In a lathe, a carriage, a pair of spaced round bars mounted on the face thereof, a tool slide mounted on said bars and hydraulic bearing means for moving said slide located in the center of the slide between said bars, the piston of said hydraulic bearing means being mounted on the carriage and the cylinder in the tool slide.

41. In a lathe, a head stock section, a pan section, a pump housing section and bar means for retaining said sections together as a unit and eccentric bushing means for supporting said bars in the head stock and pump housing section.

42. In a lathe, a head stock section, a pan section, a pump housing section, bars for retaining said sections together in alignment, and additional bars adapted to slide therein for carrying tool holders, and eccentric bushing means for all of said bars for adjusting the position thereof with respect to the head stock and pump housing sections.

43. In a lathe, means for supporting the work, tool-supporting means supported for movement in relation to the work, hydraulic means for moving the tool-supporting means, a shiftable valve means for controlling the hydraulic means and causing the successive movements of the tool-supporting means, and means for shifting said valve, including stationary cam surfaces, cam-engaging means carried by the tool-supporting means, and a connection between the cam-engaging means and the valve.

44. In a lathe, means for supporting the work, tool-supporting means, including a cylinder and a piston therein, on said supporting means, hydraulic means to move said supporting means, a source of hydraulic pressure having operative connection with said cylinder and the hydraulic means, a shiftable valve means to control the application of said pressure to the cylinder and the hydraulic means, and means for shifting said valve, including a fixed cam member and a traveling lever.

45. In a lathe, means for supporting the work, tool-supporting means, including a cylinder and a piston therein, on said supporting means, hydraulic means to move said supporting means, a source of hydraulic pressure having operative connection with said cylinder and the hydraulic means, a shiftable valve means to control the application of said pressure to the cylinder and the hydraulic means, and means for shifting said valve, including a fixed cam member, a movable cam member, and a lever adapted to be actuated by said cam members.

46. In a lathe, means for supporting the work, a movable tool-supporting means, including a transversely arranged piston and cylinder, piston and cylinder means for moving said supporting means longitudinally of the work, a source of fluid pressure, a valve member to control said fluid pressure, a fluid connection between said valve member and said first-named cylinder, and a fluid connection between the valve and the second cylinder, said last connection including a manifold supported by the supporting means, and pipes having sliding connection with the manifold.

47. In a lathe, work-supporting means, a longitudinally movable fluid-operated support, a transversely movable fluid-operated tool carrier on said support, a source of fluid pressure, operative connection between said source and support and said carrier, a shiftable valve for controlling the flow of fluid through said connection, and means for shifting said valve, said means including a fixed cam member, a cam member movably supported by said support, and a lever operated by said cam members.

48. In a lathe, work-supporting means, a longitudinally movable fluid-operated support, a transversely movable fluid-operated tool carrier on said support, a source of fluid pressure, operative connection between said source and support and said carrier, a shiftable valve for controlling the flow of fluid through said connection, and means for shifting said valve, said means including a fixed cam member, a cam member movably supported by said support, and a lever pivotally mounted on said support and operated by said cam members.

49. In a lathe, a plurality of tool carriages, means to support the carriages and means to move the carriages, said last-named means including a series of independent pumps, hydraulic systems operated by the pumps, cams and interconnected mechanical means for operating the hydraulic systems to move the carriages and tools in a sequence of operations designed to move the tools to the work, to feed into the work, to move them longitudinally of the work and return them to their initial position after the completion of the work.

50. In a lathe, a tool carriage, a piston for moving the carriage longitudinally, a piston for moving the carriage transversely, a source of fluid pressure, a valve to control the application of fluid pressure to the pistons, and means operated by the movement of the carriage and by the fluid pressure to shift the valve whereby after the valve is set in a certain position the lathe operates automatically through one cycle of operation back to an initial starting position.

51. In a machine of the class described, a reciprocable member, a cylinder and piston, one of which is connected with said member, a fluid pressure pump, said cylinder having a port at each end thereof, means including a slide valve for alternately connecting the pump with the cylinder ports, a controllable conduit connecting the pump with the slide valve casing at an end of the slide element, and a high pressure valve in said conduit opened in dependence upon a pressure rise in the cylinder at a limit of piston travel to admit the fluid to the valve casing to move the slide element and thereby reverse the connections to the cylinder.

WENDELL E. WHIPP.
CLIFFORD A. BICKEL.